Inventors
KÅRE R. MEISINGSET
IVAR MO
By [signature]
Attorney

Oct. 24, 1967 K. R. MEISINGSET ET AL 3,349,175

METHOD FOR SYNCHRONIZING CRYPTOGRAPHIC TELEPRINTER EQUIPMENT

Filed Jan. 6, 1964 26 Sheets-Sheet 2

Inventors
KÅRE R. MEISINGSET
IVAR MO
By [signature]
Attorney

Inventors
KÅRE R. MEISINGSET
IVAR MO
By [signature]
Attorney

Inventors
KÅRE R. MEISINGSET
IVAR MO
By [signature]
Attorney

Inventors
KÅRE R. MEISINGSET
IVAR MO
By [signature]
Attorney

Inventors
KÅRE R. MEISINGSET
IVAR MO
By [signature]
Attorney

Oct. 24, 1967 K. R. MEISINGSET ET AL 3,349,175

METHOD FOR SYNCHRONIZING CRYPTOGRAPHIC TELEPRINTER EQUIPMENT

Filed Jan. 6, 1964 26 Sheets-Sheet 7

Inventors
KARE R. MEISINGSET
IVAR MO
By [signature]
Attorney

Inventors
KÅRE R. MEISINGSET
IVAR MO
By
Attorney

Inventors
KÅRE R. MEISINGSET
IVAR MO
By
Attorney

Inventors
KÅRE R. MEISINGSET
IVAR MO
By [signature]
Attorney

Inventors
KÅRE R. MEISINGSET
IVAR MO
By [signature]
Attorney

Inventors
KÅRE R. MEISINGSET
IVAR MO
By [signature]
Attorney

Oct. 24, 1967 K. R. MEISINGSET ET AL 3,349,175

METHOD FOR SYNCHRONIZING CRYPTOGRAPHIC TELEPRINTER EQUIPMENT

Filed Jan. 6, 1964 26 Sheets-Sheet 13

Inventors
KÅRE R. MEISINGSET
IVAR MO
By [signature]
Attorney

Inventors
KÅRE R. MEISINGSET
IVAR MO
By [signature]
Attorney

Inventors
KARE R. MEISINGSET
IVAR MO
By
Attorney

Inventors
KÅRE R. MEISINGSET
IVAR MO
By [signature]
Attorney

Inventors
KÅRE R. MEISINGSET
IVAR MO
By
Attorney

Oct. 24, 1967 K. R. MEISINGSET ET AL 3,349,175

METHOD FOR SYNCHRONIZING CRYPTOGRAPHIC TELEPRINTER EQUIPMENT

Filed Jan. 6, 1964

26 Sheets-Sheet 18

Inventors
KÅRE R. MEISINGSET
IVAR MO
By [signature]
Attorney

Inventors
KÅRE R. MEISINGSET
IVAR MO
By [signature]
Attorney

Inventors
KÅRE R. MEISINGSET
IVAR MO
By [signature]
Attorney

Inventors
KÅRE R. MEISINGSET
IVAR MO
By [signature]
Attorney

Oct. 24, 1967 K. R. MEISINGSET ET AL 3,349,175

METHOD FOR SYNCHRONIZING CRYPTOGRAPHIC TELEPRINTER EQUIPMENT

Filed Jan. 6, 1964 26 Sheets-Sheet 22

Inventors
KÅRE R. MEISINGSET
IVAR MO
By [signature]
Attorney

Inventors
KÅRE R. MEISINGSET
IVAR MO
By
Attorney

Inventors
KÅRE R. MEISINGSET
IVAR MO
By
Attorney

Inventors
KÅRE R. MEISINGSET
IVAR MO
By [signature]
Attorney

Inventors
KÅRE R. MEISINGSET
IVAR MO
By
Attorney

United States Patent Office 3,349,175

Patented Oct. 24, 1967

3,349,175

METHOD FOR SYNCHRONIZING CRYPTOGRAPHIC TELEPRINTER EQUIPMENT

Kare Ragnar Meisingset, Stabekk, and Ivar Mo, Veitvet, Norway, assignors to International Standard Electric Corporation, New York, N.Y., a corporation of Delaware Filed Jan. 6, 1964, Ser. No. 335,801

Claims priority, application Norway, Jan. 22, 1963, 147,194/63

17 Claims. (Cl. 178—22)

ABSTRACT OF THE DISCLOSURE

There is provided a synchronizing method for cryptographic teleprinter equipment according to which a receiver may be connected to, and in synchronism with, a transmitter at any time during transmission of enciphered information, and to re-establish synchronism if synchronism is lost, without interrupting the transmission of enciphered information and without using a separate channel. When clock pulse generators are used at the transmitting end and the receiving end for maintaining synchronism during (short) interruptions of the transmission channels, the start pulse and the stop pulse to a certain extent represents redundant start/stop information. Accordingly, the start pulse time positions and/or stop pulse time positions of the enciphered teleprinter characters are periodically used for transmitting serial number information of the enciphered characters.

Figure 1:
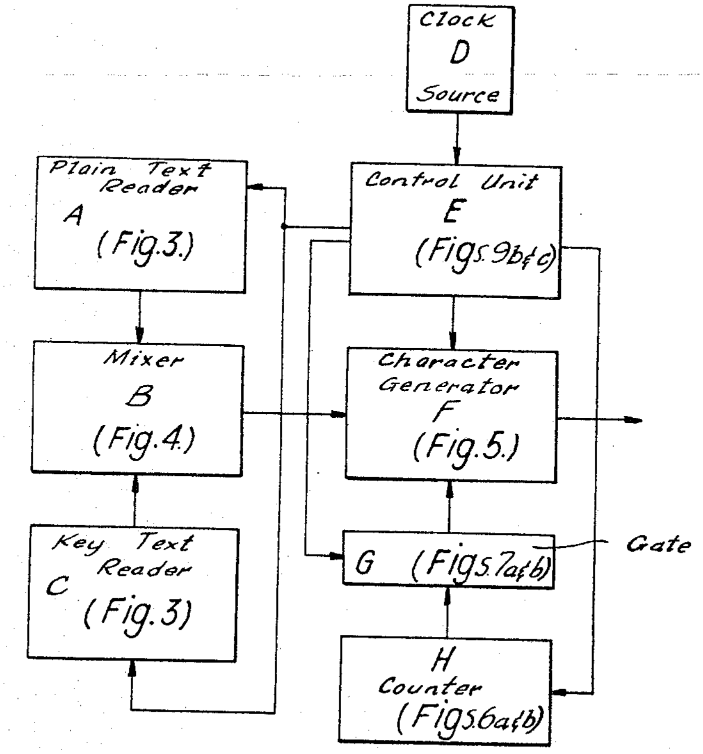

This invention relates to a method for starting and synchronizing the operation of cryptographic teleprinter equipment.

To provide a teleprinter secrecy system, it is common practice to process, at the transmitting or enciphering end of a channel, the plain text characters with a key material according to some predetermined rule. At the receiving or deciphering end, the enciphered text is processed, character by character, with a key material equivalent to that used at the enciphering end. The plain text will then be recovered, provided the identical key material is used for the enciphering and deciphering of a particular character. On the other hand, the same key material cannot be used repeatedly for enciphering several consecutive plain text characters, because the desired secrecy then would be lost.

In order to ensure a clear understanding of the present invention, a number of terms shall be defined below:

Plain text: The unciphered message text, i.e. an ordinary teleprinter message. (Usually 5-elements code).

Key material: A (digital) information for processing the code elements of the plain text teleprinter characters according to some predetermined rule.

Key text: A key material consisting of an arbitrary teleprinter text preferably comprising all 32 possible teleprinter characters arranged in a random manner.

Key character: Any one of the teleprinter characters of a key text.

Key tape: A perforated tape containing a key text.

Processing: The process of combining a plain text with a key according to some predetermined rule so as to produce an enciphered text.

Cipher text=enciphered text: A teleprinter text obtained by processing the plain text with a key material.

Teleprinter character: A binary represented signal comprising one start element, followed by five (usually) information elements and one stop element.

Start element: Also called start pulse time position, is in a normal teleprinter character represented by a SPACE-pulse of 20 ms. duration, at 50 bauds.

Information elements: Usually five elements each of which may be SPACE or MARK, thereby providing $2^5=32$ possible code combinations for transmitting messages. Pulse duration is 20 ms.

Stop element: Also called stop pulse time position, is in a normal teleprinter character represented by a MARK-pulse of 30 ms. duration.

Code element: Any one of the seven elements of a teleprinter character.

Stop/start element pair: The pair of code elements comprising the stop element in one teleprinter character and the start element in the immediately succeeding teleprinter character.

Serial number: A binary representation indicating the relative position of the enciphered characters.

Serial number period: A number of teleprinter characters between the transmission of each serial number and including one serial number.

Cycle of serial numbers: A number of teleprinter characters comprising the total number of serial number periods starting with the lowest serial number and ending with the highest serial number.

From the above it will be clear that to recover a plain text character by deciphering an enciphered character, the last mentioned character must be correctly received and its serial number (in relation to an established reference) must be known by the deciphering device.

The key material should be of random nature, but an exact duplicate of the key material used for enciphering must be available for deciphering. This can be achieved by using punched tape with random characters, one tape at the enciphering device, and a copy at the deciphering device. Another solution is to use electronic switching circuits which can generate a long sequence of semi-random (but reproducable) binary characters.

A well known solution when using a key material in the form of a series of random teleprinter characters for obtaining a different key character for every plain text character, is to step the key character source at the enciphering device one position forward for every plain text character enciphered and correspondingly step the deciphering key character source one position forward for every character received. If the two sources are started in the same position the plain text will be recovered by the deciphering device as long as no character is lost on the transmission channel. If, however, interruptions or distortions occur, the two key sources may lose synchronism. The following deciphered text will then be garbled.

The problem of maintaining the synchronism of the key sources can be solved by using a clock pulse source of high accuracy and stability for governing the transmitting speed at the enciphering terminal. An equivalent clock pulse source is then used at the receiving (deciphering) end. During periods of good transmission, it will adjust its phase (and if necessary its frequency) in accordance with the transmitting source. The receiving clock pulse source is used for generating stepping pulses for the deciphering key source and it will continue to do so in periods of interruptions on the transmission channel. In this way, key source synchronism is maintained even if one or more characters should be lost on the transmission channel.

Another problem is that of starting the key sources at some predetermined position at exactly the same moment. In many cases, the starting point (e.g. the initial key character serial number) is established manually by attendants at the enciphering and deciphering terminals.

However, this procedure normally requires a two way transmission channel between the two terminals, and the starting of the key character source stepping at exactly the same time will then be achieved by sending a start signal on the transmission channel.

It will be understood that it is desirable that the operation of cryptographic equipment should be possible without attendants at the receiving (deciphering) terminal and without the use of a return channel for checking that the deciphering is performed correctly. This can be done, provided the receiving (deciphering) key generator is set to the same position as the transmitting (enciphering) key generator at regular intervals during transmission.

To make this possible, two requirements must be fulfilled.

(1) The deciphering key generator must be able to correct its position in accordance with information received from the enciphering cryptographic equipment, i.e. in accordance with the serial number of the enciphered characters.

(2) The information about the serial number of the enciphered characters must be transmitted as clear text, otherwise it could not be used by the deciphering equipment for reestablishing synchronism.

A known solution to these problems is based on an interruption of the regular encrypted transmission at regular intervals and transmission of serial numbers instead. This method has, however, some disadvantages. Firstly, the interruption of regular information transmission is not always acceptable in broadcast networks.

Secondly, since the normal encrypted text is of random nature, a rather complicated signal is needed to inform the deciphering equipment that information about serial numbers of the enciphering characters is coming.

The main feature of the present invention is that the start pulse time positions and/or stop pulse time positions of the enciphered teleprinter characters are used for transmitting information about the serial number of the enciphered characters.

Since the start and stop pulses are not enciphered, the problem of preparing the deciphering equipment for receiving information about the serial number of the enciphered characters will not be a difficult one. Further, the regular transmission of encrypted information is not interrupted by the transmission of information about enciphered character serial number. This is a great advantage, particularly in broadcast networks.

It is assumed that the transmitter and the receiver(s) all are provided with identical key sources, and that both transmitter and receiver(s) via separate information channels have agreed upon the key material to be used at any time. If, therefore, both transmitter and receiver(s) were provided with clock pulse generators which are able to step in synchronism for long periods of time without being corrected, say for days, it would obviously be possible to switch the cryptgraphic equipment of a receiving station into correct stepping synchronism with that of the transmtiting end without using other synchronizing means. Such exact clock pulse generators are however very expensive, and are therefore not very practical. In connection with the present invention it is possible to use less exact clock pulse generators.

As mentioned, the start and/or stop pulse time positions are used according to the present invention, for transmitting information about the serial number of the enciphered characters.

It is considered convenient to transmit this information in form of a serial number, indicating the setting of the key source, a perforated tape, in relation to a certain starting time position.

The period of time between such starting time positions may be chosen at will, and it may be 24 hours, 1 hour or ½ hour. Thus, a series of serial numbers is repeatedly transmitted at more or less regular intervals within each of said time periods.

Each teleprinter character offers two time position for transmitting said information and when e.g. five succeeding characters are considered, the start/stop time positions of these five characters represent a total of ten time positions. Each of these time positions may be chosen at will to be either MARK or SPACE, and in this case the ten bits (time positions) may be used to represent one of $2^{10}$ different combinations. Suppose now that it is desired to transmit, a serial number for every tenth character, using the start/stop time positions at five, of every ten characters for this purpose. In connection with such an arrangement it should be noted that it may be practical to let the serial number which is transmitted in the start/stop time positions of e.g. characters Nos. 1–5, indicate the serial number of e.g. the 10th character, and then let the serial number which is transmitted in the start/stop positions of e.g. characters Nos. 11–15 indicate the serial number e.g. the 20th character.

These serial numbers do not necessarily have to be a binary representation to the number 10, 20 etc. They might as well be a binary representation at the number 1, 2 etc., or they might be represented according to some other rule.

The above examples must obviously not be considered as limitations to the scope of the present invention, as the numbers indicated may be varied in a great number of ways.

Working the above example a little further, assuming that the first serial number transmitted is a binary representation of the digit 1 indicating the time position of the 10th character transmitted, then the last serial number possible (No. 1024) will indicate the time position of the 10240th character transmitted. Thus a time period of 10240 characters is obtained corresponding to 10240/0.15 seconds (at 50 baud)=683 seconds or approx. 11 minutes, and this time period is then repeated again and again. It should here once more be emphasized that the transmission of the said serial numbers is completely independent of the encrypted messages transmitted via the five information elements of the teleprinter character.

By changing the above mentioned numbers, by using twenty bits for transmitting each serial number, it is possible to give a representation of any one of all characters transmitted at 50 baud during a whole day, $$\left(2^{20}=1.048.576\right.$$

possible combinations, while $$\left.\frac{24\times60\times60}{0.15}=576.000 \text{ characters/24 hours}\right)$$

Instead of using both start and stop pulse positions in groups of succeeding characters for transmitting the said serial numbers, it will obviously be possible alternatively to use: (a) start and stop pulse positions of every second character or some other intervals, (b) only the start pulse positions, (c) only the stop pulse positions, (d) the start pulse positions, letting the succeeding stop pulse positions assume the inverse value or vice versa, (e) the start pulse position, letting the preceding stop pulse positions assume the inverse value or vice versa, or (f) some combination of the methods mentioned.

It should be noted that in any of the above suggested embodiment sof the present invention the transmitting and receiving equipment both must be designed to satisfy the mode of operation chosen.

It is, however, only considered necessary for the full understanding of the present invention to explain in detail *one* embodiment of the invention.

Instead of considering the start pulse time position of a teleprinter character in conjunction with the stop pulse time position of the same teleprinter character, the said start pulse time position of a teleprinter character is considered in conjunction with the stop pulse time position of the preceding teleprinter character and each set of two time position and the preceding stop pulse time position will as mentioned be called a *stop/start element pair*.

In order to ensure correct operation of the teleprinter equipment, it is considered necessary that each stop/start element pair contain complementary pulses, i.e. when the stop element is SPACE, the start element must be MARK, and vice versa.

Each one of a series of serial numbers is transmitted in a time period of 25 characters, which time period as mentioned is called a *serial number period*. Each such serial number period is constituted by the following sequence: 14 ordinary stop/start element pair (SPACE/MARK) and then 10 stop/start element pairs carrying information about the respective serial number, the stop elements of the last 10 stop/start element pairs representing 10 binary bits, while the start elements represent redundant information.

By letting 10 stop/start element pairs (10 bits) represent each serial number, a total of $2^{10}=1024$ combinations is possible. This total number of 1024 combinations is, however, reduced to 1000 in order to correspond to 40 serial number periods. A time period corresponding to 1000 characters is as mentioned called one cycle of serial numbers, starting with the lowest serial number and ending with the highest serial number. As the total possible number of characters transmitted at a speed of 50 bauds during 24 hours is as mentioned 576,000, this means that this series of teleprinter characters transmitted during 24 hours, are accompanied by 576 successive cycles of serial numbers.

A ten-stage binary counter is stepped in synchronism with the setting of the key source (the stepping of a key tape), but the instantaneous conditions of the counter are not transferred to the transmitting device, as this would call for a storage device. As stated above, the 14 first stop/start element pairs in a serial number period are normal, and the 15th pair is inverted so as to indicate the start of next 10 pairs carrying information about the said serial number. Assume now that the first serial number period is considered. Then the 16th pair is controlled so as to correspond to the first stage of the counter, the 17th pair is controlled so as to correspond to the second stage of the counter etc. while the 25th pair is controlled so as to correspond to the tenth stage of the counter.

The information thus transmitted via the 16th–25th stop/start element pairs of each serial number period may easily and unambigously be compared with a corresponding counter at the receiving end. As a result of this comparison, the key source at the receiving end is set in order to obtain synchronism between the two key sources.

Figure 2:
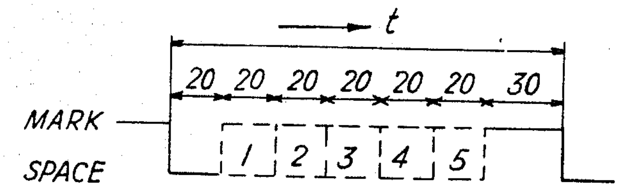
Figure 3:
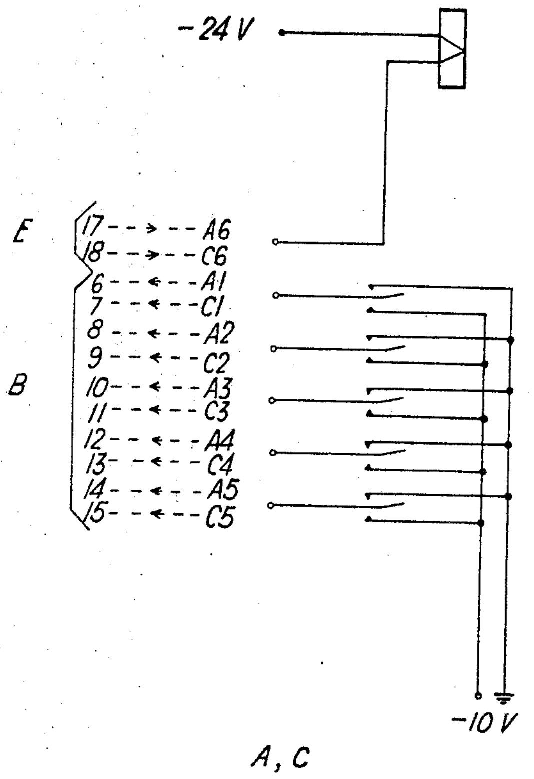
Figure 4:
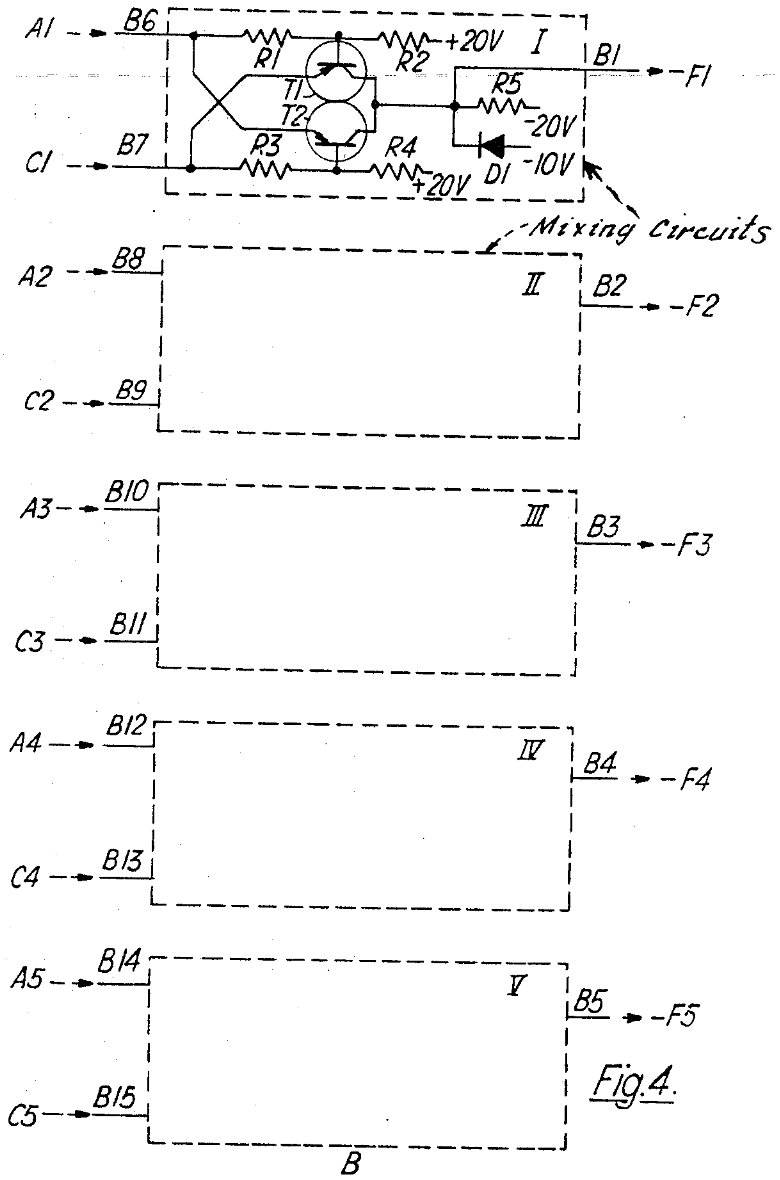
Figure 5:
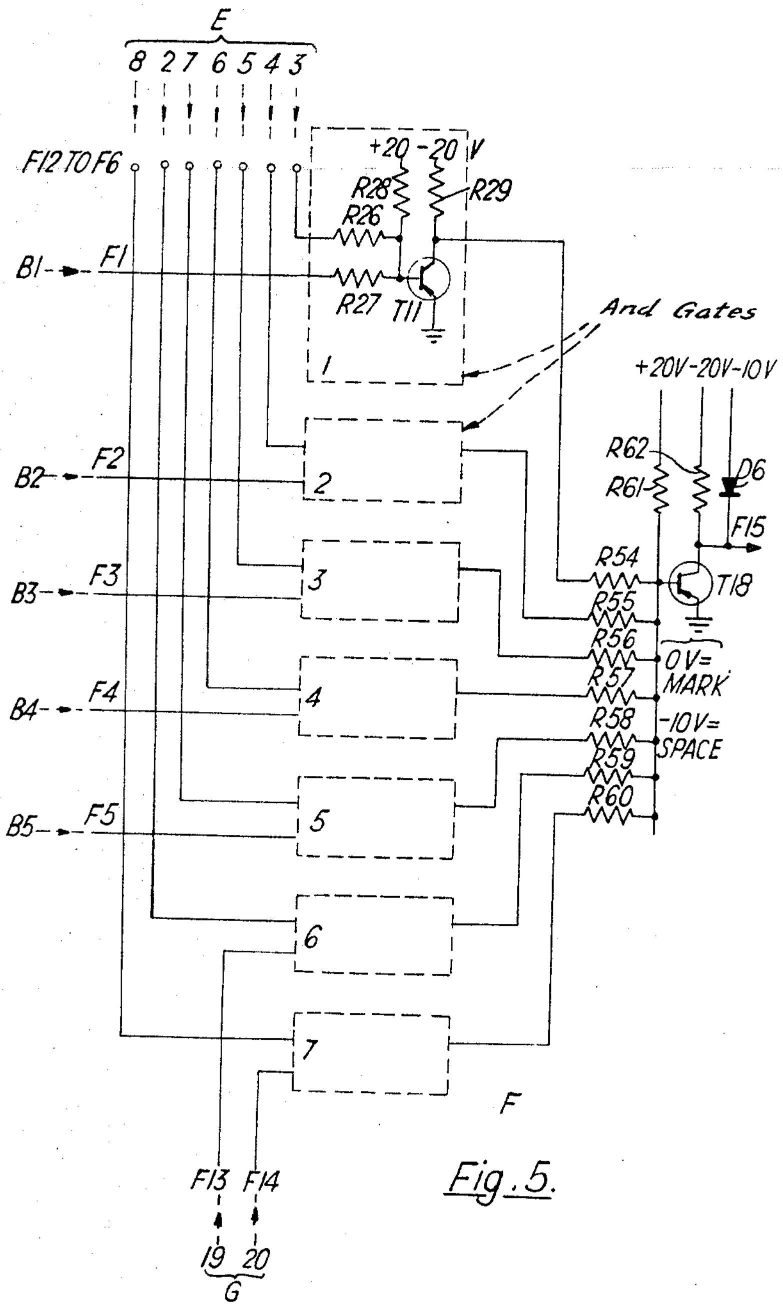
Figure 7:
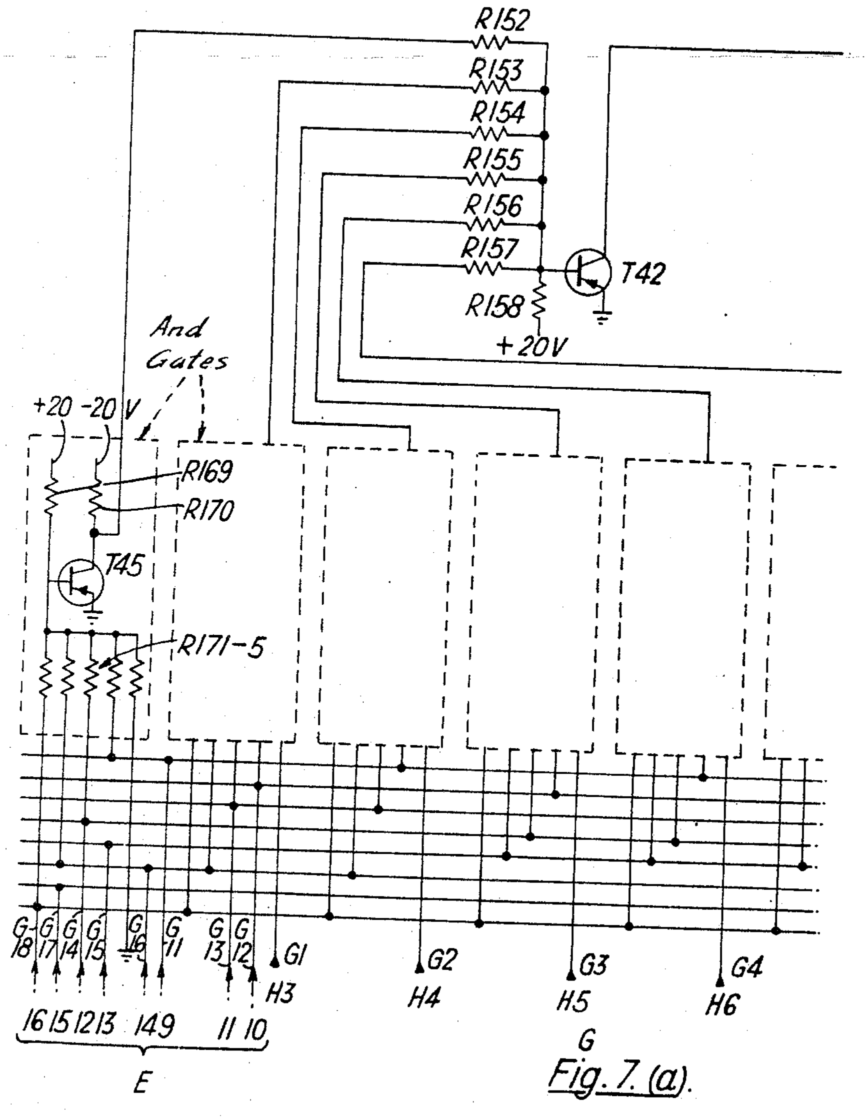
Figure 7:
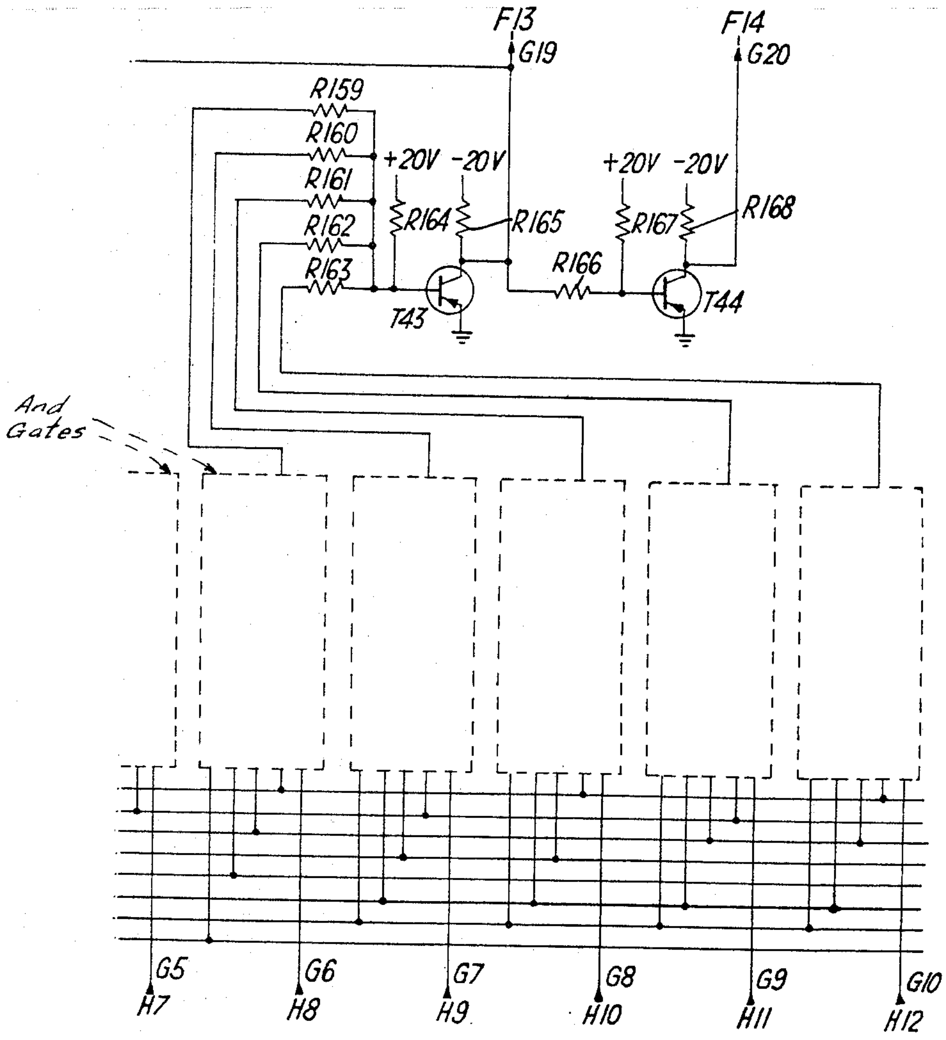
Figure 9A:
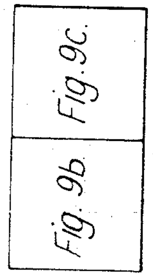
Figure 8:
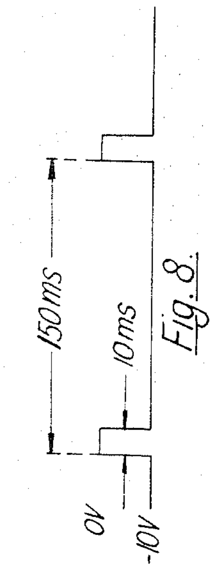
Figure 15:
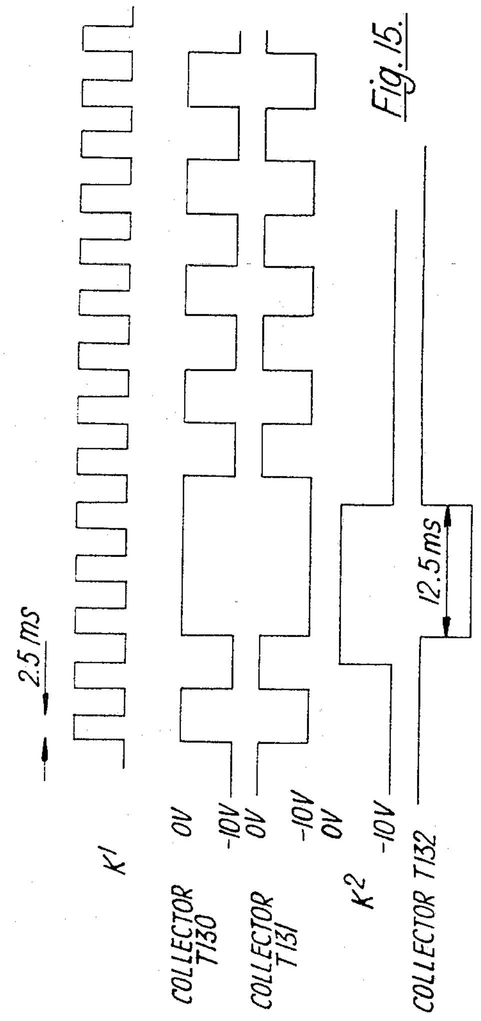
Figure 9B:
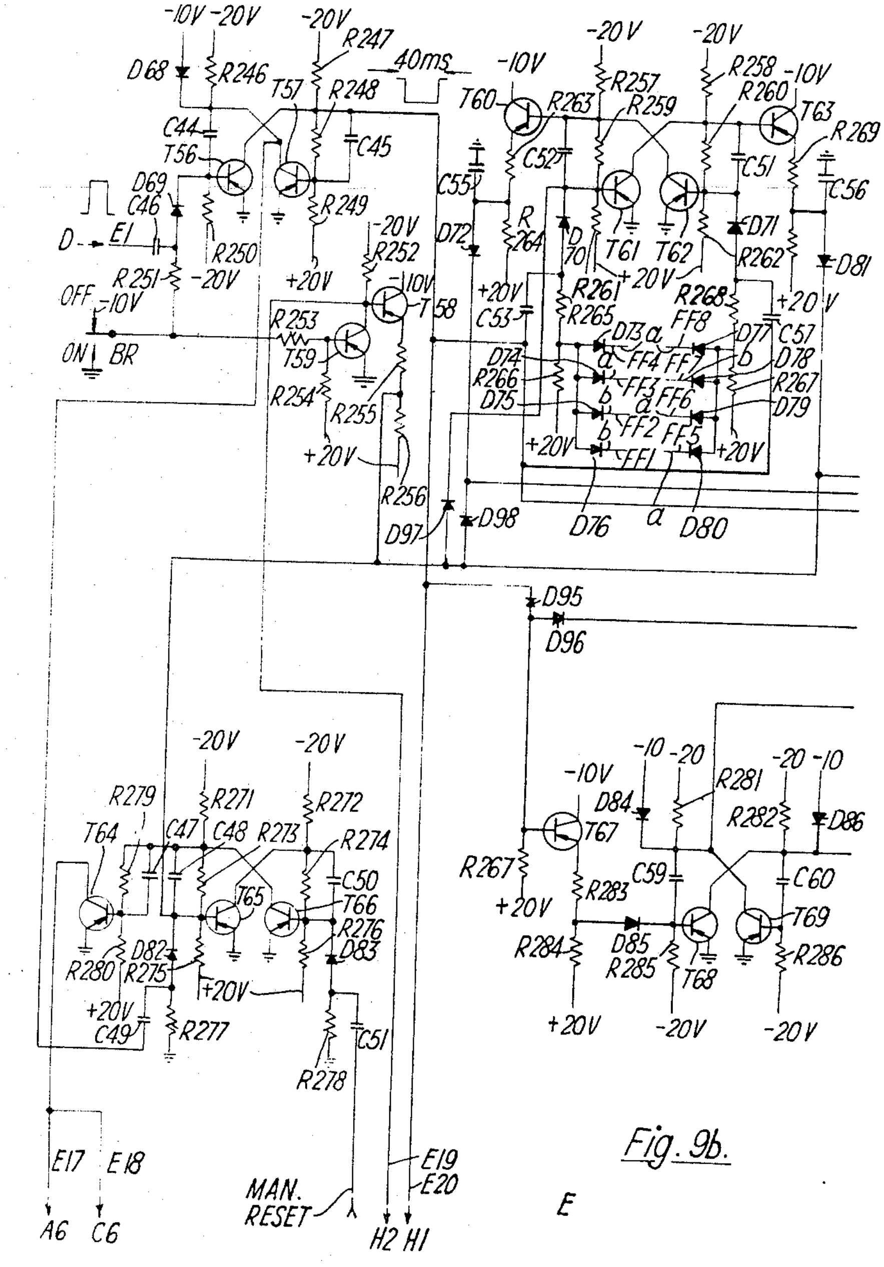
Figure 9C:
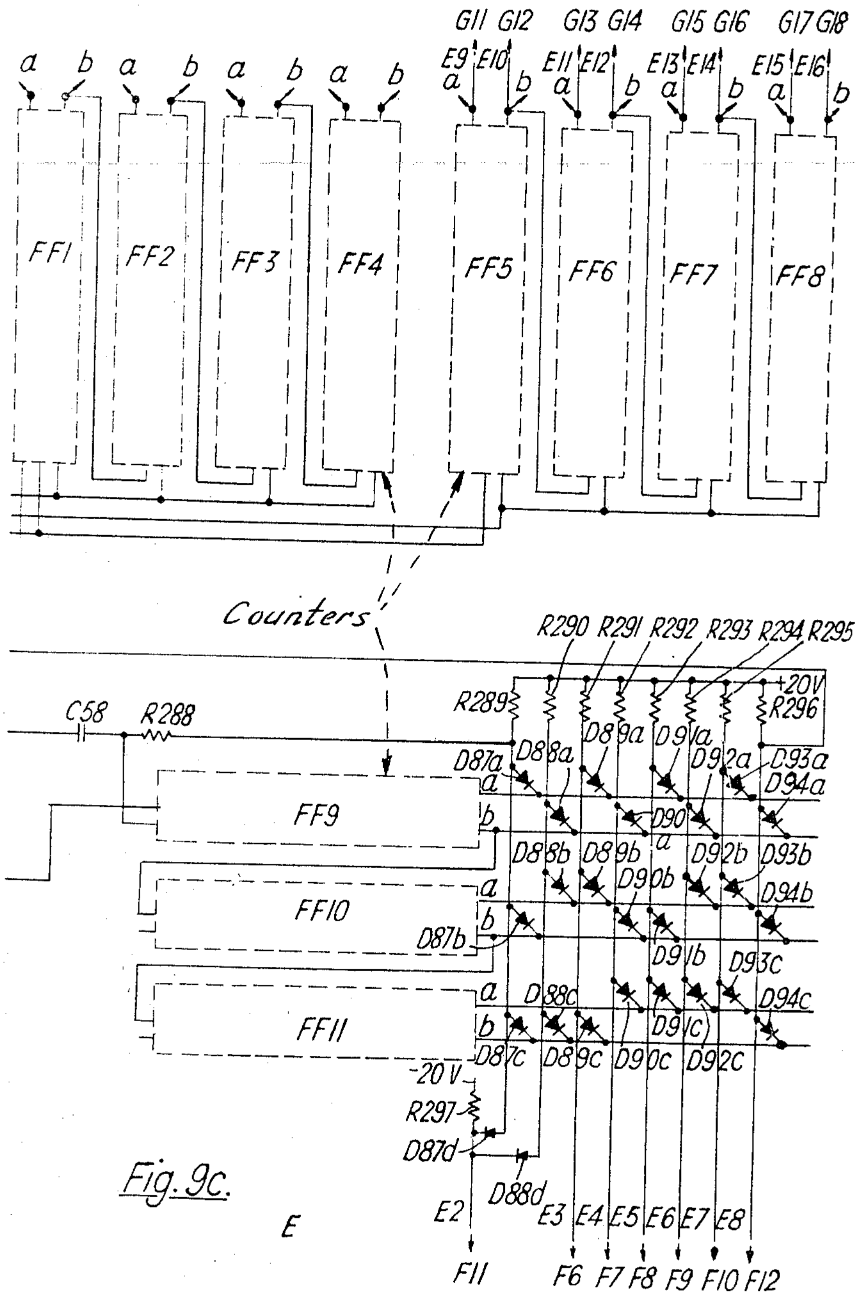
Figure 10:
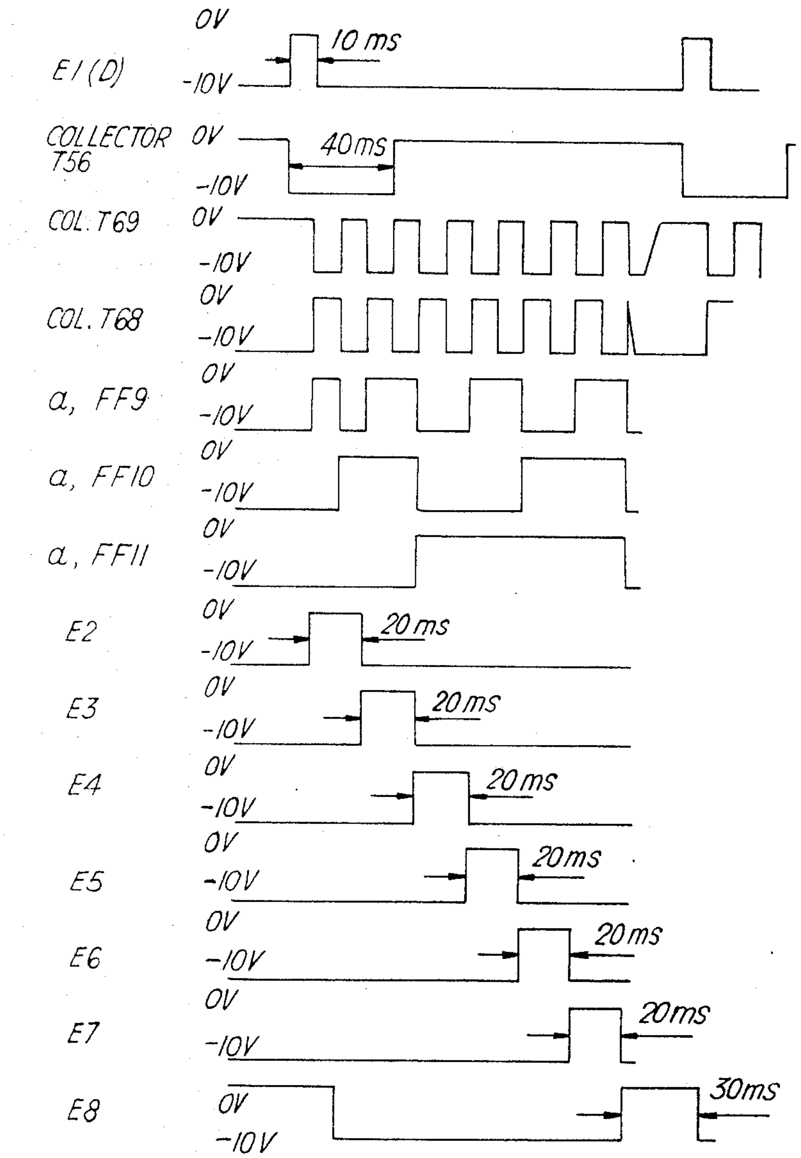
Figure 11:
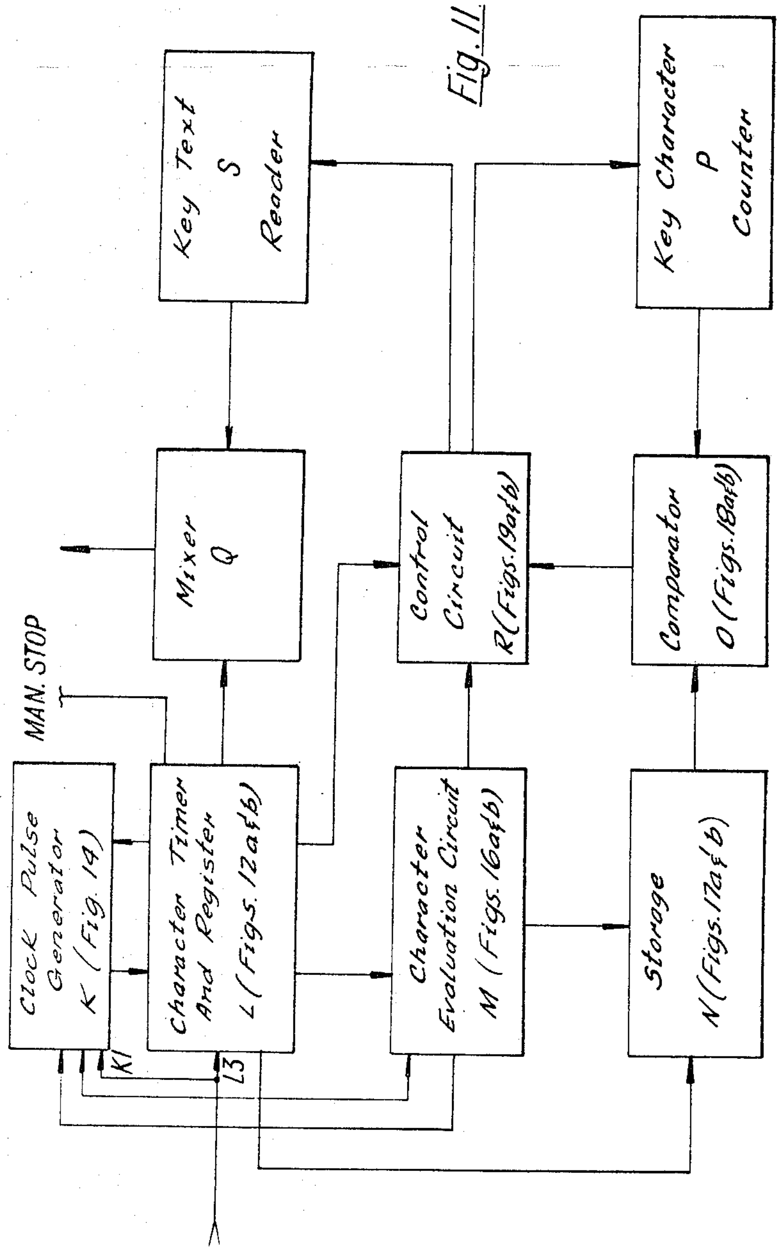
Figure 12:
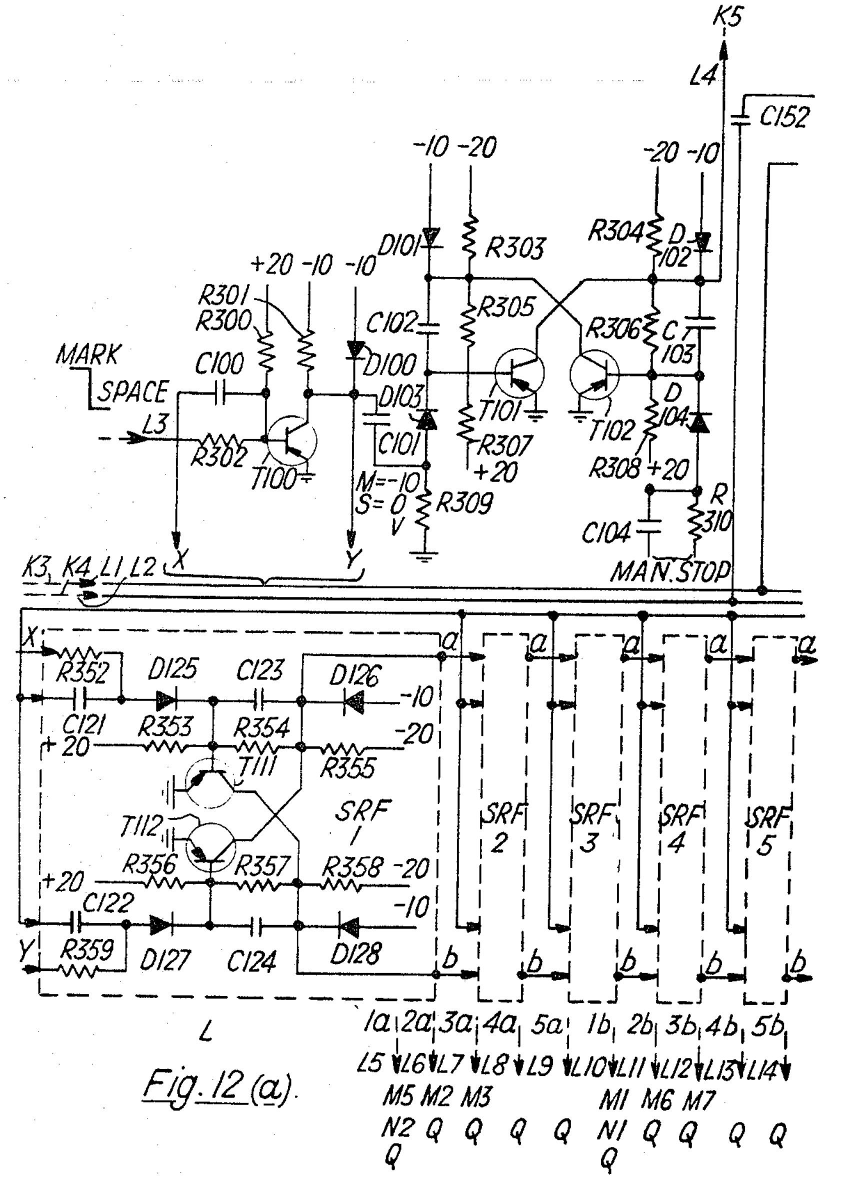
Figure 13:
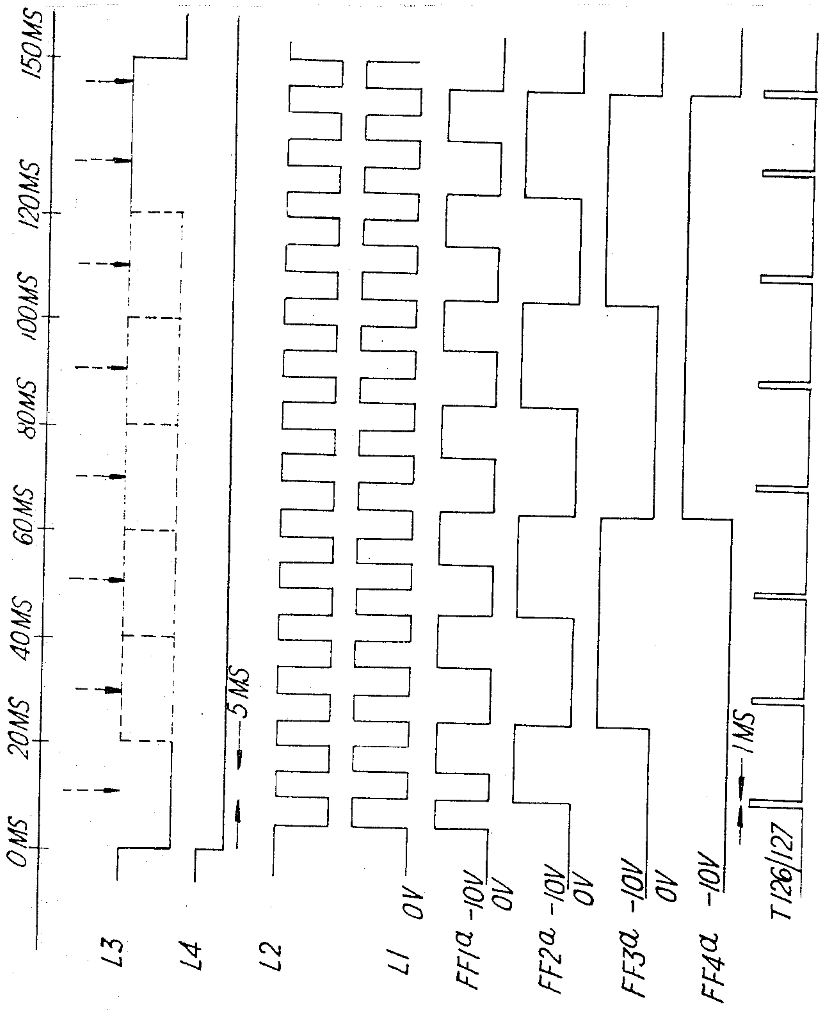
Figure 14A:
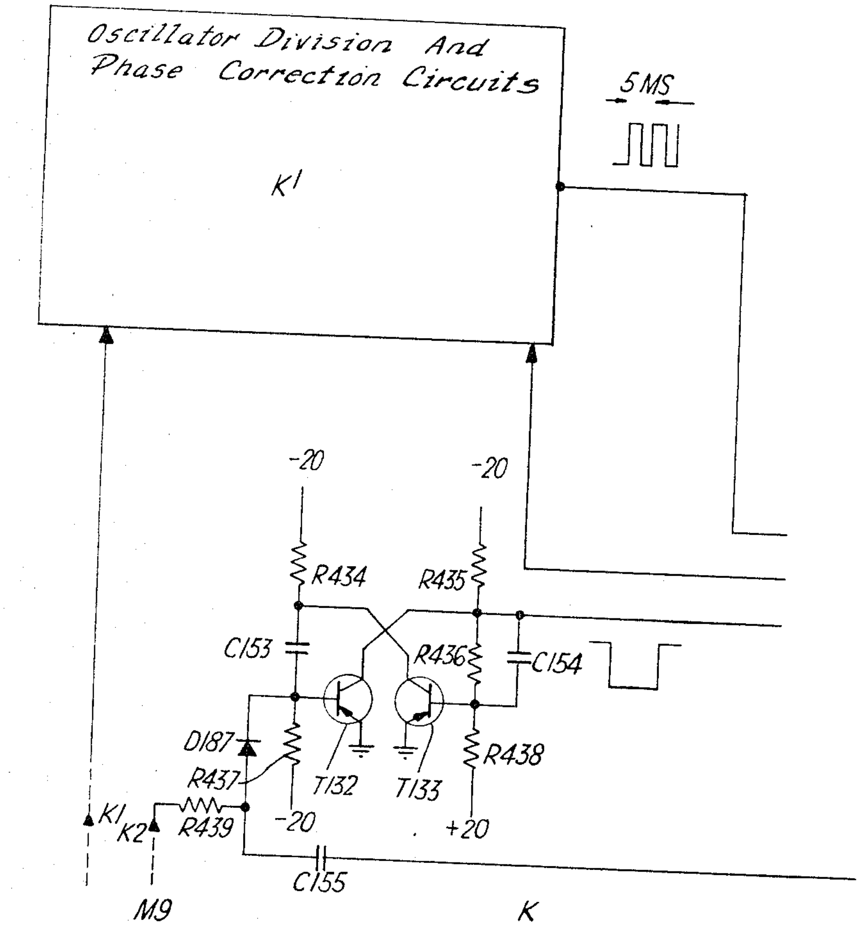
Figure 14:
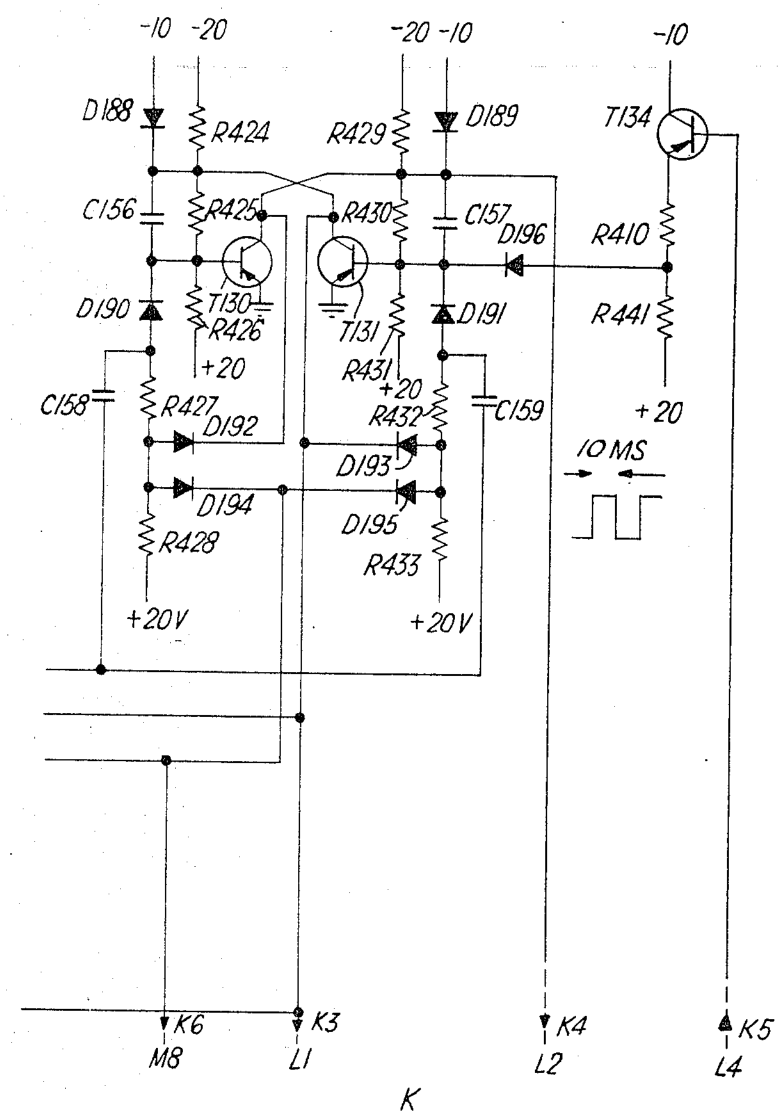
Figure 16:
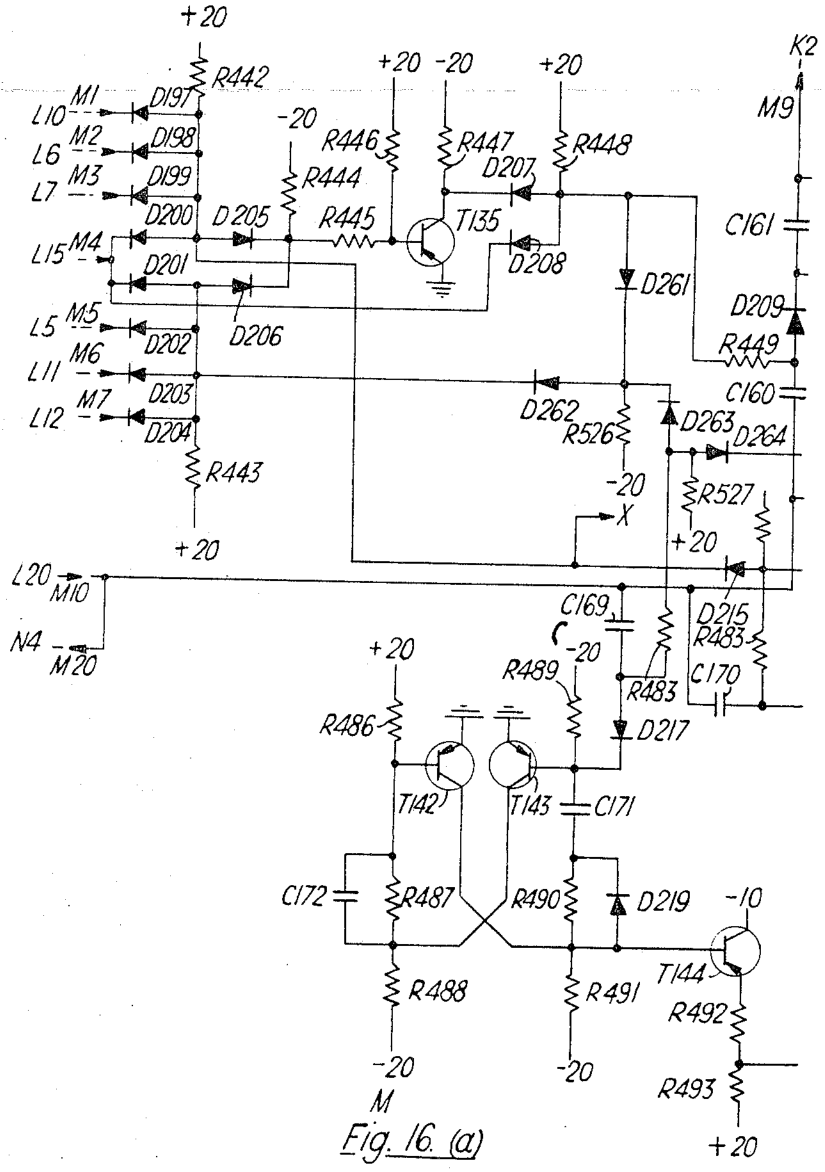
Figure 17A:
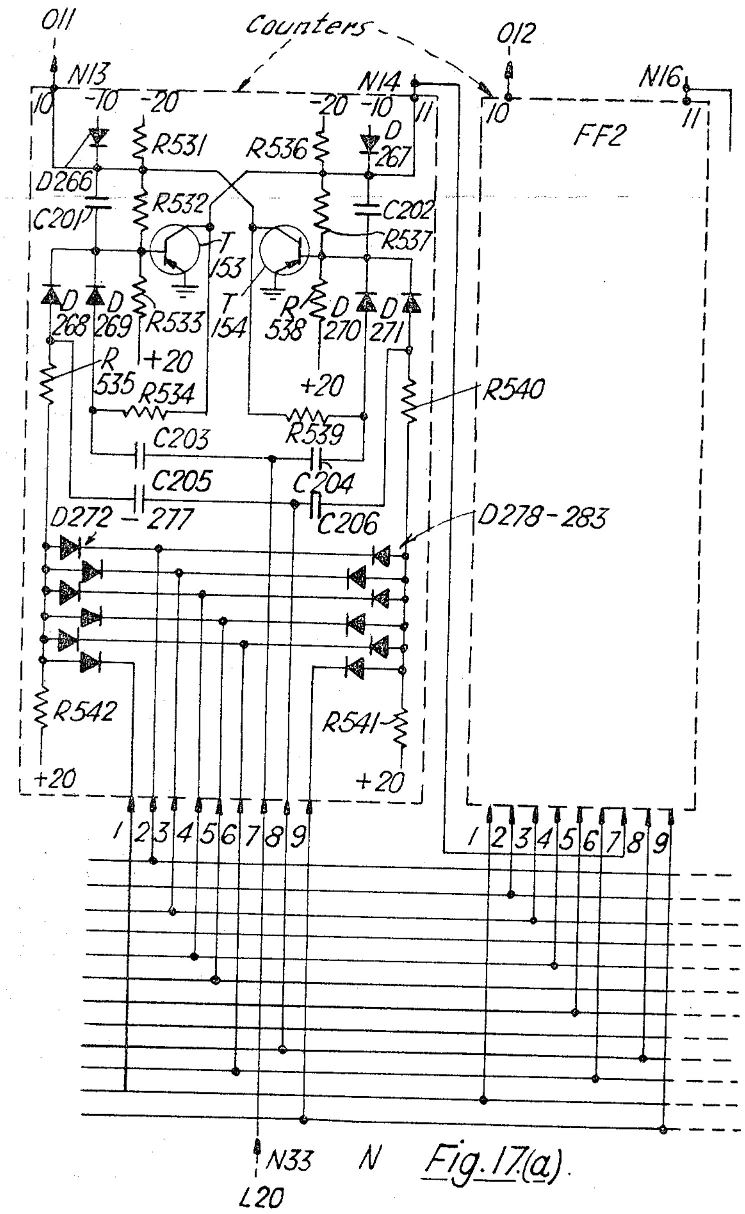
Figure 18A:
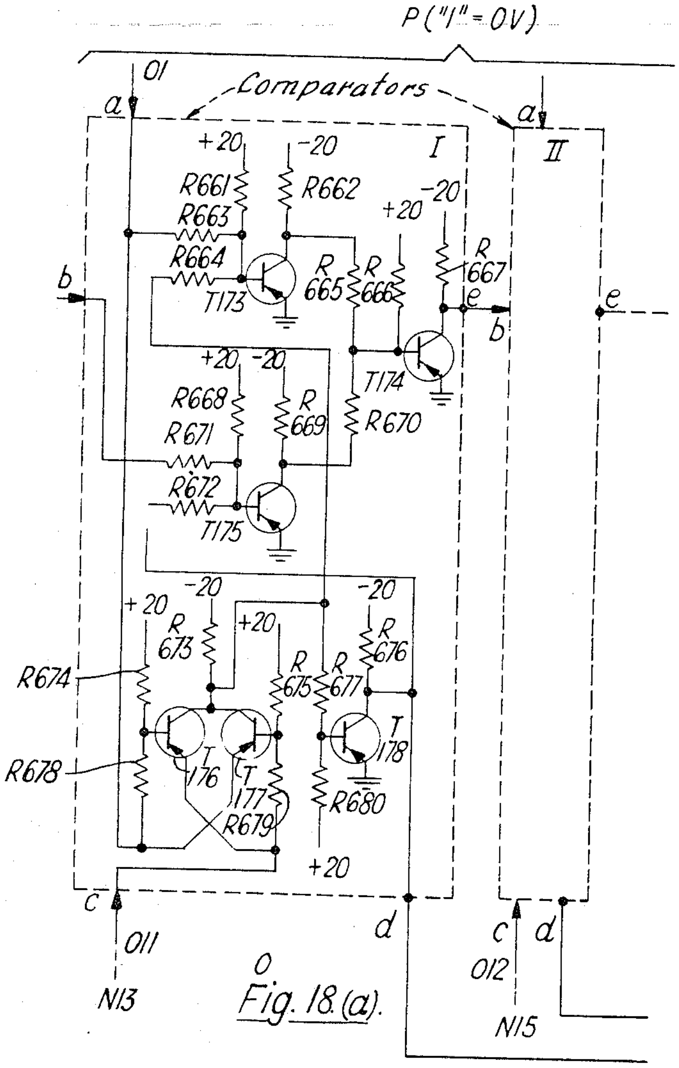
Figure 18:
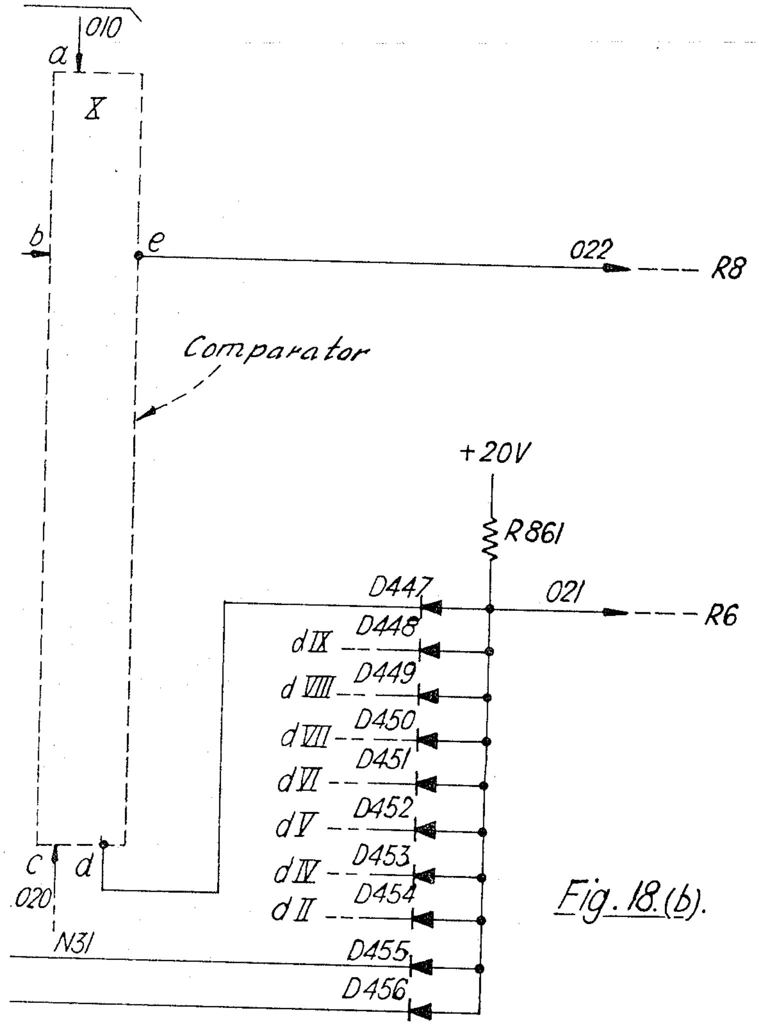
Figure 19A:
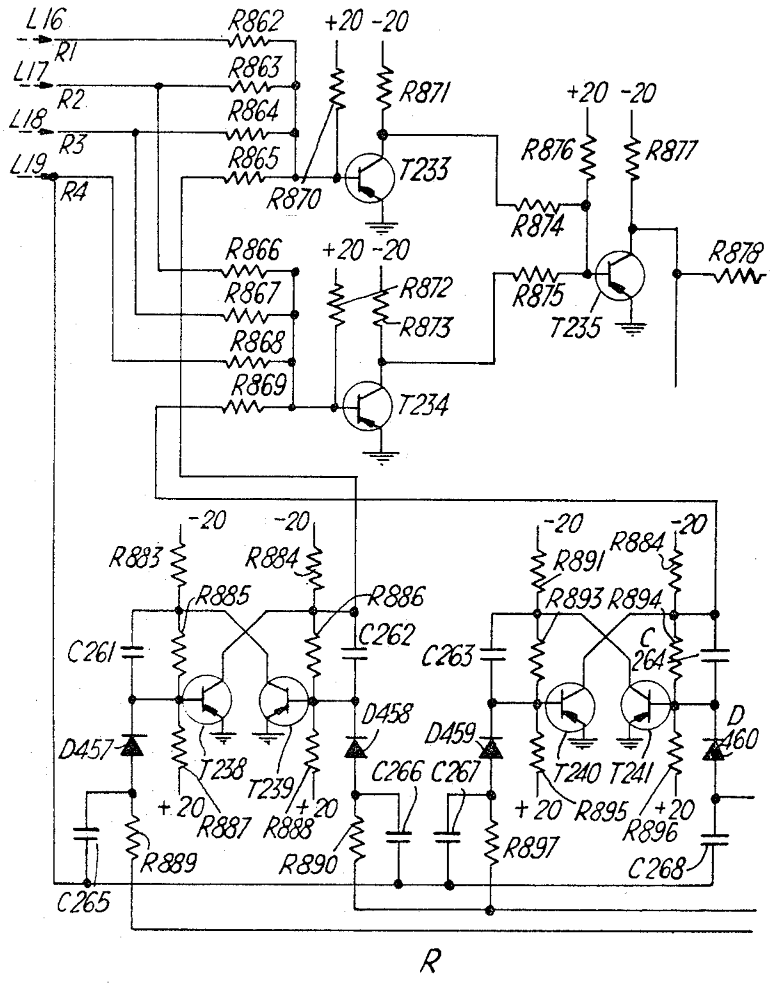

The following detailed description, in which the key material is considered to be a one time key tape, should be read in conjunction with the drawings, of which:

FIG. 1 shows a block schematic of the transmitting equipment, and reference is made in each block to the drawing containing the corresponding detailed schematic, FIG. 2 shows the representation of an ordinary teleprinter character, FIG. 3 shows a detailed schematic of block A and C in FIG. 1, a plain or key text tape readers, FIG. 4 shows a detailed schematic of block B in FIG. 1, a mixer, FIG. 5 shows a detailed schematic of block F in FIG. 1, a character generator, FIGS. 6*a* and *b* show a detailed schematic of block H in FIG. 1, a counter, FIGS. 7*a* and *b* show a detailed schematic of block G in FIG. 1, a gate, FIG. 8 shows the waveform of the signal from block D in FIG. 1, a clock pulse generator, FIG. 9*a* shows how FIG. 9*b* and FIG. 9*c* should be placed with respect to each other, FIG. 9*b* and 9*c* shows a detailed schematic of block E in FIG. 1, a control unit, FIG. 10 shows the character timing and pulse generator waveforms, FIG. 11 shows a block diagram of the receiving equipment and reference is made in most blocks to a figure showing the corresponding detailed schematic, FIGS. 12*a* and *b* show a detailed schematic of block L in FIG. 11, a character timer and register, FIG. 13 shows some of the waveforms appearing in the character timer and register circuit of FIG. 11, FIGS. 14*a* and *b* show a detailed schematic of block K in FIG. 11, a clock pulse generator, FIG. 15 shows some of the waveforms appearing in the clock pulse generator of FIG. 14, FIGS. 16*a* and *b* show a detailed schematic of block M in FIG. 11, a character evaluation circuit, FIGS. 17*a* and *b* show a detailed schematic of block N in FIG. 11, a storage circuit, FIGS. 18*a* and *b* show a detailed schematic of block O in FIG. 11, a comparator, and FIGS. 19*a* and *b* show a detailed schematic of block R in FIG. 11, a key tape reader control circuit.

In FIG. 2 is shown a normal teleprinter character, which comprises 7 binary elements, the 6 first ones being of equal duration. The last element is of 50% longer duration than the preceding ones. At a transmitting speed of 50 baud, the first 6 elements will have a duration of 20 ms. each, the last one 30 ms. The total duration of one character is then 150 ms. The two possible signal values are designated MARK and SPACE, MARK corresponding to the idle line condition.

The first and last element of a character, normally called the start and stop pulse, are used for synchronization of the receiver. The start pulse (element) is always SPACE, the stop element MARK. The five information elements can be any sequence of SPACE and MARK. Thus $2^5=32$ different characters are possible.

As mentioned above, the purpose of the start and stop elements is to provide a synchronizing signal for the receiver, since a normal teleprinter receiver will not function properly unless the synchronizing pulses are received. However, if the transmission rhythm is governed by a stable and accurate clock pulse source, the two synchronizing pulses of each character are to some extent redundant information which need not be transmitted continuously. If, therefore, the receiving equipment is provided with a stable clock pulse source equivalent to the one at the transmitting terminal, the start and stop pulses of each teleprinter character can be generated locally at the receiving terminal. The transmission of start and stop pulses over the transmission channel will then only be needed for a relative short time at more or less regular intervals to make possible corrections of the receiving equipment clock pulse source. In the periods between the start/stop pulse transmission, the time positions of the start/stop elements can therefore be used for transmission of information about key character serial numbers.

*Transmitter.*—In FIG. 1, the blocks A and C represent the plain text and key text tape readers respectively. Both tape readers are supplied with stepping pulses from control unit E, so as to advance the tape in each tape reader one step forward for each pulse. The outputs from the tape readers are applied to a mixer B in which the parallel information elements of the plain text is mixed with the key text so as to produce a cipher text. From the mixer B, the parallel cipher text is applied to a character generator F in which it is converted into a series signal and is provided with appropriate start and stop elements before being transferred to the transmission channel to be used.

A clock pulse source D is arranged for providing the control unit E with timing pulses. The control unit E controls a counter H, a gate G and the character generator F, so as to ensure that the teleprinter characters at the output of the character generator F are provided with appropriate start and stop elements.

The different blocks of FIG. 1 will now be explained in detail.

The schematic of the plain text tape reader (A, FIG. 1) and the key tape reader (C, FIG. 1) is shown in FIG. 3. The five change-over contacts are controlled by means of sensing fingers, which are spring-urged against the tape. The five information elements of each teleprinter character are represented in the tape as hole or no hole, hole corresponding to MARK. In FIG. 3 the contacts are shown without tape inserted, i.e. with all contacts in MARK position. As can be seen from the schematic, a MARK element will be represented by 0 volt on its output lead, a SPACE element by −10 volts. Output lead No. 1 corresponds to element No. 1, lead 2 to element 2 and so on. The information leads A1, C1, A2 . . . A5, C5 from the tape readers are connected to the mixer inputs, B6–B15. Each tape reader is also provided with a stepping relay, which is operated by pulses of 0 v., supplied by the control unit E. Each stepping pulse will advance the tape one character position.

The detailed schematic of the mixer B is shown in FIG. 4. It comprises 5 identical blocks, one for each information element. Each circuit has 2 input terminals on the left side and one output terminal on the right side. Each block comprises two transistors, e.g. T1–T2, 5 resistors, e.g. R1–R5 and one diode, e.g. D1. The input signals are either 0 volt representing MARK, or −10 volt representing SPACE. Mixing circuit I receives element 1 of the plain text and key text characters read by the plain text and key text tape readers respectively, mixing circuit II receives the elements No. 2 and so on. If the two input signals to one block of the mixer are equal, both transistors of that particular block will be nonconducting, so that the resulting output signal is −10 volt, i.e. SPACE. The output signals are fed to the character generator F. If the two input signals are different, the transistor receiving 0 volt on its emitter will be conducting in the saturated mode of operation. The nominal output voltage will in this case therefore be 0 volt or MARK. Thus, equal elements will give SPACE output, while different elements will give MARK. If this process is repeated in the receiving equipment with identical key character elements the plain text character elements will be recovered.

The detailed schematic of the character generator F is shown on FIG. 5. Its purpose is to convert the parallel signals from the mixer B and the gate G to normal teleprinter signals which are of the serial type as shown in FIG. 2. This is done by means of timing pulses supplied from the control unit on the leads F6–F12. The leads F1–F5 carry the signals representing the information elements of the teleprinter character. Information for the start and stop pulse time positions is supplied on F13 and F14 from the gate G. On all terminals of this circuit, 0 volt represents MARK, −10 volt SPACE. The circuit comprises 7 resistor-transistor logic circuits (1–7), the outputs of which are connected to a further resistor-transistor logic circuit (T18 and associated components R54–R62 and D6) with 7 inputs. Each of the resistor-transistor logic circuits 1–7 comprises a transistor, e.g. T11 and four resistors, e.g. R26–R29. This combination of resistor-transistor logic circuits will function as 7 AND-gates combined into an output OR-gate, if 0 volt signals on the input side are considered as "true" and −10 volts as "false." To switch the signal of a particular time position, say information element No. 2 (terminal F2) through to output terminal F15, its associated timing pulse input F7 must be at 0 v. The output terminal F15 will then assume the same nominal voltage as the input terminal F2. When the timing pulse input terminal F7 is at −10 volts, the signal on F2 will not affect the output terminal.

FIGS. 6*a* and *b* show the detailed schematic of the counter H. It comprises 10 flipflops in a normal binary counter circuit, plus a diode AND-gate controlling a monostable multivibrator whose output signal is used for resetting the counter via an emitter follower circuit. Each counter stage comprises two transistors, e.g. T19–T20, eight resistors, e.g. R63–R70, four capacitors, e.g. C1–C4 and five diodes, e.g. D7–D11. The diode AND-gate comprises ten diodes D57–D66 and one resistor R143. The monostable multivibrator comprises two transistors T39–T40, six resistors R144–R149, three capacitors C41–C43 and one diode D67. The counter outputs designated 1*a*, 2*a* . . . 10*a* are connected to the diode AND-gate as shown. Connecting leads are not shown in order to simplify the schematic. The normal cycle of a 10-stage binary counter is 1024 (0–1023), and by means of the reset circuit a cycle of 1000 (0–999) is obtained. The purpose of this arrangement is to make the counter cycle equivalent to 10 key tape segments of 100 characters each.

The counter is stepped one position forward by each key tape reader magnet pulse supplied on input terminal H1. Resetting of the counter when the equipment is in rest position can be provided by a 0 volt signal on input terminal H2. The output signal comprises the 10 binary digits which appear on terminals H3–H12. When the counter is in reset position, all the output terminals will carry −10 volt signal. Designating this voltage level "0," and 0 volt "1," the output sequence will be

| H 12 | H 11 | H 10 | H 9 | H 8 | H 7 | H 6 | H 5 | H 4 | H 3 | Decimal |
|---|---|---|---|---|---|---|---|---|---|---|
| 0 | 0 | 0 | 0 | 0 | 0 | 0 | 0 | 0 | 0 | 0 |
| 0 | 0 | 0 | 0 | 0 | 0 | 0 | 0 | 0 | 1 | 1 |
| 0 | 0 | 0 | 0 | 0 | 0 | 0 | 0 | 1 | 0 | 2 |
| 0 | 0 | 0 | 0 | 0 | 0 | 0 | 0 | 1 | 1 | 3 |
| 0 | 0 | 0 | 0 | 0 | 0 | 0 | 1 | 0 | 0 | 4 |
| 1 | 1 | 1 | 1 | 1 | 1 | 1 | 1 | 1 | 1 | 1023 |

This output sequence is suppied to the gate G, terminals G1–G10, whose detailed schematic is shown in FIGS. 7*a* and *b*. The gate G comprises 11 input resistor-transistor logic circuits, each with 5 input leads, of which 4 receive their signals from a binary counter in the control unit E via terminals G11–G18. The 5th input lead of each resistor-transistor logic circuit receives the signal to be switched through to the output terminals G19–G20. Each of the 11 input resistor-transistor logic circuits comprises one transistor, e.g. T45 and seven resistors, e.g. R169–R175. The outputs from the 11 resistor-transistor logic circuits are fed to two transistors T42–T43 via associated resistors R152–R158 and R159–R164. The transistor T44 and its associated resistors R166–R168 constitute an inverter whose purpose is to provide an output signal which is complementary to the output signal from transistor T43 (resistor R165). The whole gate circuit will act as 11 AND-gates with 5 inputs each, combined into an output OR-gate whose output lead is connected to an inverter. The purpose of the gate circuit is to supply the character generator with information for the start and stop pulse time positions of each teleprinter character to be transmitted. Output G19 will carry the information of the start pulse time position, G20 the information of the stop pulse time position. As will be understood, the information contained in these two positions will always be complementary, i.e. the information is coded with one redundant bit. This is to make possible error detection at the receiving end. When normal teleprinter characters are transmitted, the transistors of all the eleven input resistor-transistor logic circuits are conducting. In this case T42 and T43 are nonconducting, corresponding to SPACE/MARK (−10/0 v.) in the start/stop pulse time positions respectively. The binary counter in the control unit whose output signals are supplied on G11–G18, will then be in position 0000. In position 0001 of this counter, T45 will become nonconducting. The 5th input of left resistor-transistor logic circuit is connected to ground (0 v.) as shown, and this corresponds to MARK/SPACE in the start/stop pulse time positions, i.e. the opposite of normal. This change of the information contained in the start/stop pulse time positions from SPACE/MARK to MARK/SPACE is used as start signal for the transmission of key character counter position, the 10 digits of the key character counter positions are then switched through to G19–G20, one after the other, the least significant digit first. The binary digits 1 and 0 are transmitted as MARK/SPACE and SPACE/MARK in the start/stop pulse time positions respectively.

The output waveform of the clock pulse source (Block D, FIG. 1) is shown in FIG. 8. Positive pulses of 10 ms. duration are provided at intervals corresponding to the duration of one teleprinter character at 50 baud speed, i.e. 150 ms. The accuracy of this interval is great enough to keep the transmitting and receiving equipment in synchronism during line interruption of 2 minutes. If interruptions of longer duration occur, the receiving equipment may temporarily lose synchronism. However, as soon as a short line interruption ceases, the receiving equipment key will be brought in step with that of the transmitting (enciphering) equipment by means of the information contained in the start/stop element time positions.

The detailed schematic of the control unit is shown in FIGS. 9*b* and *c*. The different parts will be described below.

A monostable multivibrator (comprising two transistors T56–T57, five resistors R246–R250, two capacitors C44–C45 and one diode D68) is triggered by the clock pulse signals supplied from the source D via terminal E1, capacitor 46 and diode 69, provided that 0 v. is applied as shown via resistor R251 when the switch BR is in the "on" position. The pulse duration of the monostable multivibrator is 40 ms.

The inverted output pulse appearing on the collector of T56 is used for controlling the following circuits: (a) A reset flipflop circuit comprising four transistors T60—T63, fourteen resistors R257–R270, six capacitors C52–C57 and twelve diodes D70–D81. (b) A normal-start-pulse counter, which is a binary counter having four stages FF1–FF4 of the same type as shown in FIG. 6*a*. (c) A gate control counter (mentioned in the description of FIG. 7*a*). This is a four stage binary counter comprising the four flipflops FF5–FF8. (d) A character timing pulse generator circuit comprising an astable multivibrator (comprising three transistors T67–T69, seven resistors R281–R287, two capacitors C59–C60 and three diodes D84–D86) connected via a diode D96, a capacitor C58 and a resistor R288 to binary counter (FF9–FF11) and a diode matrix (D87–D94, R289–N297).

The positive output pulse appearing on the collector of T57 is used for controlling the tape reader stepping pulse generator which comprises three transistors T64–T66, ten resistors R271–R280, five capacitors C47–C51 and two diodes D82–D83.

A reset circuit (comprising transistors T58–T59 and resistors R252–R256) is also arranged in connection with the off-on switch BR and diodes D97–D98 for providing manual reset of a plurality of circuits as shown.

The functioning of the character timing pulse generator mentioned above will now be explained in detail. The waveforms of interest in this connection are shown in FIG. 10.

In the "off" state, the base of T67 will be at 0 volt. Therefore, the base of T68 will be positive with respect to ground, and the multivibrator will be kept in its non-oscillating state with T68 in nonconducting and T69 in conducting state. As soon as the first pulse from the monostable multivibrator T56–T57 arrives the locking of the astable multivibrator will end, and it starts oscillating with the first transistion 10 ms. after leading edge of the pulse from the monostable multivibrator T56–T57. The counter FF9–FF11 will then be stepped every time T68 starts conducting. In addition, an extra trigger pulse is supplied on the reset terminal of FF9. The purpose of this arrangement is to make the counter return to its rest position after 7 multivibrator cycles. The diode matrix constitutes 8 AND-gates, two of which have their outputs combined into an OR-gate comprising D78*d*–D88*d* and R297. Positive pulses corresponding to the 7 elements or time positions of a teleprinter character, will then appear on the terminals E2–E8, as shown in FIG. 10. After the beginning of the 7th multivibrator period, the counter will be in rest position. The cathode of D96 will then be at 0 v., thereby locking the multivibrator since D95–D96 and R287 constitute an AND-gate whose output becomes 0 v. T68 will then be forced into its nonconducting state. At the arrival of the next pulse from the monostable multivibrator, the astable multivibrator again starts oscillating.

The reset flipflop T61–T62 and the counters FF1–FF4 and FF5–FF8 work in the following manner. When BR is switched from "off" to "on" position, T61 will be cut off, while T62 will be conducting. Thereforce, counter FF5–FF8 will be held in rest position permanently by the emitter follower T60. 40 ms. after the arrival of each clock pulse, the counter FF1–FF4 will be stepped by the trailing edge of the 40 ms. pulse from the monostable multivibrator. When the counter has been stepped 12 times, the output of the AND-gates comprising D77–D80 and R267 will rise from −10 to 0 v. The trailing edge of the 13th pulse from the monostable multivibrator will then trigger the flipflop T61–T62. The counter FF1–FF4 will now be reset by the emitter follower T63 while the locking of the counter FF5–FF8 is ended.

The counter FF5–FF8 will be stepped from reset (zero) position by the trailing edge of the monostable multivibrator, and it is used for controlling the gate G described earlier (FIG. 7). When the counter is in its reset or zero position, the information delivered by the gate G for the start and stop pulse positions will be SPACE and MARK respectively. In position 1 of the counter FF5–FF8, the start pulse time position information will be MARK and the stop pulse time position information will be SPACE. In the following 10 positions of the counter FF5–FF8, the information of each stage in the counter H (FIG. 6) will be switched through to the output of the gate G, the least significant digit first. Since the counter FF1–FF4 and FF5–FF8 are always stepped by the trailing edge of the pulse from the monostable multivibrator, they will change their state in a time position corresponding to the middle of the first information element of each teleprinter character (see FIG. 10). Therefore, the following sequence, called a "serial number period," will appear on the output terminal F15 of the character generator F. The first 14 characters will have SPACE in the start pulse time position while the preceding stop elements will all be MARK. The 15th stop-start element pair will be SPACE-MARK. This is the inverse of the normal information which is MARK-SPACE. This inverted stop-start element pair acts as a start signal for the transmission of counter position information. The following 10 stop-start element pairs will then contain the information of the 10 stages of the counter as explained in the description of the gate G. Thus, one "serial number period" comprises 25 characters. The first 14 stop-start element pairs are normal (MARK-SPACE), then comes one inverted (SPACE-MARK), and the last 10 contain the information of the 10 stages of the counter.

The information elements of each character will be determined by the signals from the plain and key text tape readers, which are stepped once for every character by the magnet pulse generator J64–J66 on FIG. 9*b*. It comprises a flipflop T65–T66 and an output amplifier T64 which is normally nonconducting. When conducting, T64 will supply driving current for the stepping magnets of both tape readers. The flipflop is triggered "on" by FF11 when this counter stage returns to normal. This happens at the end of information element No. 5 of each teleprinter character. The flipflop is triggered off by the leading edge of the pulse from the monostable multivibrator. Therefore, the tape reader magnet stepping pulse corresponds to the first 20 ms. of the stop element of each teleprinter character transmitted.

*Receiver*.—The block schematic of the receiver unit is shown in FIG. 11.

As regards the start and stop elements, the functioning of the receiver can be divided into two main parts:

(1) Establishment of start/stop element synchronism.

(2) Reception, storage and utilization of start/stop element information.

The signal from the transmission line is applied to the circuit blocks K and L, which contain a clock pulse generator, and character timer and register, respectively. The five information elements of the telephinter characters received are applied to block Q, a mixing circuit similar to that shown in FIG. 4, to which also the information elements of a key text is applied from block S, a key text tape reader.

The information about the time position of the key text at the transmitting end, which is transmitted via the start/stop elements of the received teleprinter characters are applied to a comparator O via a storage circuit N. A key tape reader control circuit R controls the stepping of the key tape reader S and ensures that a key character counter P is stepped in synchronism with the key tape reader. The output of the key character counter P is applied to the comparator O, while the output signal from this comparator O controls the key tape reader control circuit R, so as to ensure that the key tape reader S is synchronized with the key tape reader at the transmitting end.

A character evaluation circuit M is also provided in order to obtain start/stop element synchronism.

The following detailed description of the receiver will be in compliance with this division into two main functioning modes.

FIGS. 21*a* and *b* show the detailed schematic of block L of the receiver, designated character timer and register. The incoming signal on the transmission line arrives on terminal L3, and is applied to an input inverter-amplifier, comprising transistor T100, resistors R300–R302, capacitor C100 and diode D100. Its purpose is to provide a complementary value of the input signal, which together with the input signal is applied to a five-stage shift-register SFR1–SFR5 via internal terminals *x*-÷-*y*, and via a capacitor C101 to trigger a flipflop circuit, comprising transistors T101–T102, resistors R303–R309, capacitors C102–C103 and diodes D101–D104, from its "off" to its "on" position when the first MARK-SPACE transition after a reset period occurs. A capacitor C104 and a resistor R310 are provided for allowing the circuit to be reset manually. The output signal from this flipflop appearing on terminal L4 is used for controlling the clock pulse generator as described later. The functioning of this flipflop and other parts of the character timer and register will be apparent from the waveforms shown on FIG. 13.

The designations on the waveforms in FIG. 13, show at which points in FIGS. 12*a* and *b* the respective waveforms appear. Thus, L3 shows the waveform on terminal L3 in FIG. 12*a* and also the waveform applied via internal terminal *x* to the first stage of the shift register SRF1–SRF5. In the waveform L3, the start element (0–20 ms.) is shown as SPACE and the stop element (120–150 ms.) is shown as MARK, while the 5 information elements are shown with broken lines, as each of these may be MARK or SPACE. The arrows pointing at the teleprinter elements correspond to the pulses shown at the bottom of FIG. 13, the first seven pulses being spaced by 20 ms. and the 7th and the 8th being spaced by 15 ms. These pulses appear on the collector of T127 and the emitter of T126. The waveforms L4, L2 and L1 correspond to the waveforms on terminals L4, L2 and L1 respectively, and the waveforms FF1*a*–FF4*a* correspond to the outputs *a* from the flipflop FF1–FF4.

The blocks FF1–FF4 constitute a four-stage binary counter, and the detailed schematic of each block is the same as shown in FIG. 6*a*. Due to the feedback path terminating in the junction R423–C152, the counting cycle will be 15, if referred to the waveform on terminal L1. This corresponds to the duration of one teleprinter character, i.e. 150 ms. The output signals from the counter stages are supplied to the inputs of 8 AND-gates, comprising R311–R318 and D145–D176. Seven of the AND-gates have their outputs combined into an OR-gate comprising R319 and D177–D183. The output signals from this OR-gate and the 8th of the AND-gates mentioned above, are used for controlling a monostable multivibrator, via resistors R415–R416, capacitor C151 and diodes D184, D186. Timing pulses are also supplied via C148. The monostable multivibrator comprises transistors T128–T129, resistors R417–R422, capacitors C149–C150 and diode D185, and its output is connected to a double emitter follower output amplifier (T126–T127). The output waveform from T126–T127 consists of 8 positive pulses of 1 ms. duration during each teleprinter character. The 1 ms. pulses are used for controlling the 5-bit shift register SRF1–SRF5 and it will be evident that the start element, the 5 information elements and two samples of the stop element will pass the shift register. Each shift register stage comprises two transistors (e.g. T111–T112), eight resistors (e.g. R252–R259) four capacitors (e.g. C121–C124) and five diodes (e.g. D105–D109). The outputs from the shift register is applied to the mixer Q, the character evaluation counter M and to the storage N via terminals L5–L14.

FIGS. 14*a* and *b* show the schematic on the clock pulse generator K. One part K' of it comprising oscillator, division circuits and phase correction circuit is not shown in detail.

The purpose of the phase correction circuits is to adjust the positive edges of the waveform on terminal L1, in FIG. 13 (terminal K3, FIG. 14*b*) in coincidence with the MARK-SPACE and SPACE-MARK transitions of the line signal (terminal K1). Only small corrections of the order 0.5 ms. are performed, while several principles may be used, for example, the one described in Norwegian Patent No. 100,789 (Meisingest 7–1–1).

The clock pulse generator K also comprises a flipflop circuit (transistors T130–T131, resistors R424–R433, capacitors C156–C159 and diode D188–D195), a stop circuit (T134, R440–R441, D196) receiving its release signal from the character timer and register L, and a monostable multivibrator (transistors T132–T133, resistors R434–R438, capacitors C153–C154). The multivibration is controlled by a signal from the character evaluation counter M via resistor R439 and diode D187, and by the pulses occurring on the collector of T131 via C155. The functioning of this circuit arrangement will be clearly understood by reference to the pulse diagram shown in FIG. 15. In FIG. 15, the designations of the waveforms indicate at which points in (FIGS. 14*a* and *b*) the said waveforms appear. The waveform K' therefore indicates the output signal from the block K' in FIG. 14*a*.

Figure 12B:
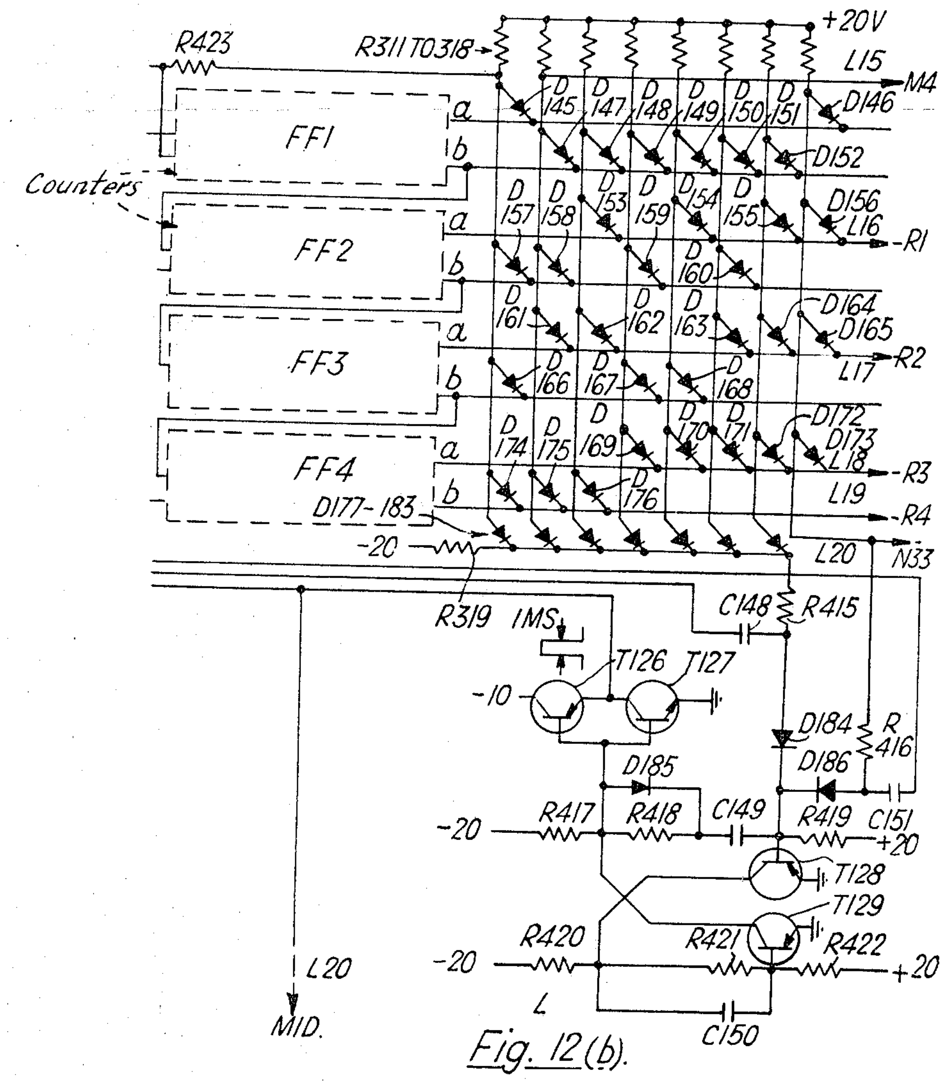

The purpose of the clock pulse generator is to make possible adjustments in steps of 10 ms. of the counter FF1–FF4 in FIG. 12*b*, with respect to the incoming teleprinter signals. Whenever a positive pulse from the character evaluation circuit M appears on terminal K2, the stepping of the counter FF1–FF4 in the character timer and register circuit L, will be delayed 10 ms. with respect to the incoming teleprinter characters. This arrangement is necessary since the receiver clock pulse generator may drift considerably (several characters) with respect to the transmitter during long break periods on the transmission channel. When signals are received, this will not happen because of the phase correction circuit mentioned above. When the monostable circuit T132–T133 is in its quiescent state, the collector of T132 will be at 0 volts. The bistable circuit T130–131 will then work as a frequency division flipflop. Its triggering waveform is a square wave with period duration 5 ms. supplied from the block K' (oscillator, division circuits, phase correction circuits). Its output waveform will be a square wave with period duration 10 ms. When the monostable circuit is triggered, the collector of T132 will assume a negative voltage, thus preventing the flipflop circuit from being triggered, as the components R428, D192, D194 and R433, D193, D195 constitute two AND-gates. The pulse duration of the monostable circuit is 12.5 ms., and the triggering of the bistable circuit will, therefore, be delayed with 4 transitions, i.e. 10 ms.

FIGS. 16*a* and *b* show the detailed schematic of the character evaluation, circuit M. The purpose of this part of the receiver is to provide the necessary control signals for synchronizing the counter FF1–FF4, FIG. 12*b* with the incoming teleprinter signals.

As described earlier, the elements of the incoming teleprinter signal will be stored in the 5 bit shift register in FIG. 12*a*. When the counter of FIG. 12*b* is in position 0100 (corresponding to the middle of the first information element of the teleprinter character when synchronism is established), the information contained in the first 3 stages of the shift register in FIG. 12*a*, will contain the start element in SRF1 and the two samples of the preceeding stop element in SRF2 and 3. (See FIG. 13.) An evaluation of the information content of SRF1–SRF3 is performed in the counter position mentioned above (0100) by means of the diode AND-gates on the upper left part of FIG. 16*a*. The AND-gate comprising R442 and D197–D200 will have its output at 0 v., only if the counter of FIG. 12*b* is in position 0100, and the information stored in SRF1–SRF3 is SPACE-MARK-MARK. The AND-gate comprising R443 and D201–D204 will have its output at 0 volt in the same counter position (0100), only if the information stored in SRF1–SRF3 is MARK-SPACE-MARK. This combination corresponds to an inverted stop-start element combination, the former to a normal stop-start.

R444, D205, D206 constitute an OR-gate. T135 and associated components (R445–R447) constitute an inverter and R448, D207, D208 and AND-gate. R526, D261, D262 constitute an OR-gate, R527, D263, D264 an AND-gate.

Figure 16B:
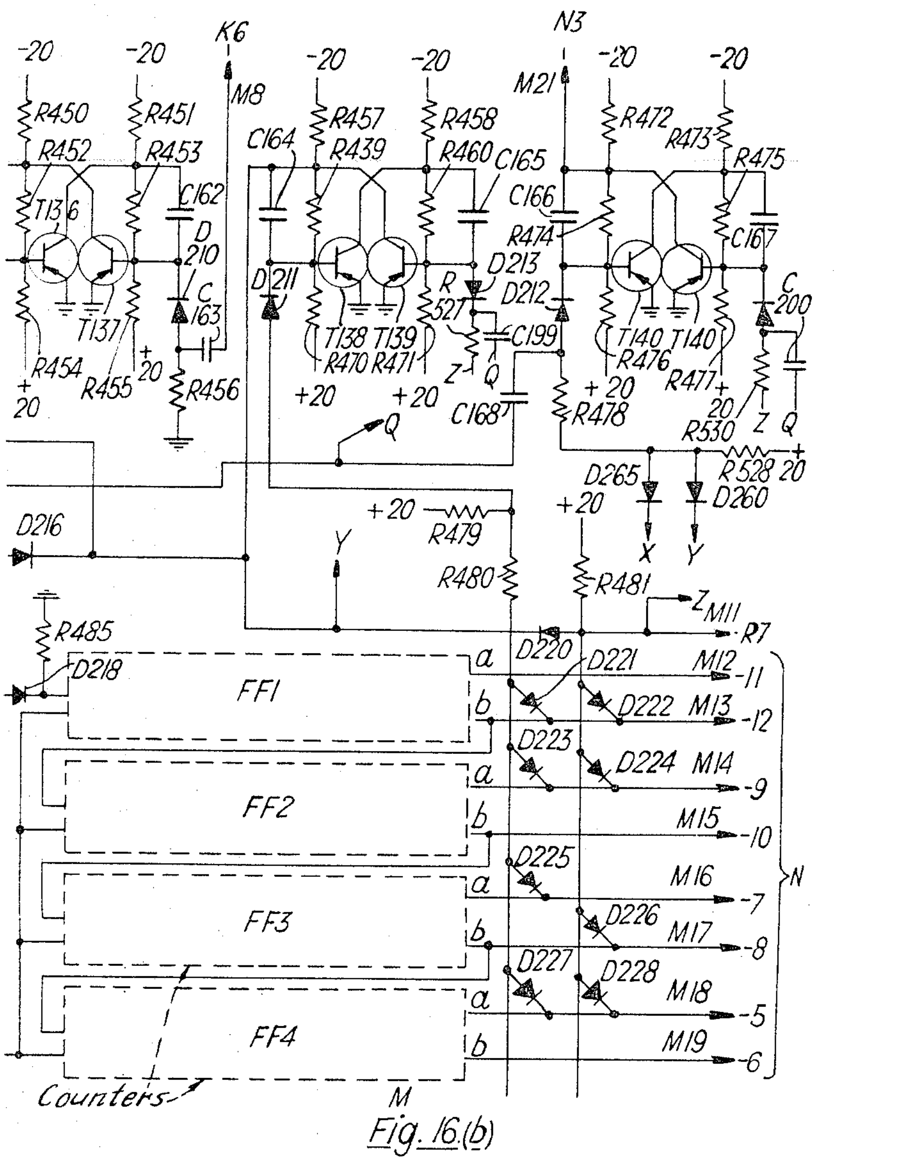

The monostable multivibrator comprising T142–T143 and associated components (R486–R491, C171–C172 and D117, D119) is in connection with an emitter follower output amplifier T144, R492, R493, used for resetting a four stage binary counter FF1–FF4, FIG. 16*b*. The detailed schematic of the blocks FF1–FF4 is the same as shown for the counter in FIG. 6*a*. The output signals of the counter in FIG. 16*b* are fed to AND-gates (D221–D229) whose purpose is to detect the counter positions 1010 (10) and 1110 (14). This will be explained more detailed in the following. The purpose and functioning of the three flipflops:

(1) Transistors T136–T137, resistors R449–R456, capacitors C160–C163 and diodes D209–D210.
(2) Transistors T138–T139, resistors R457–R460, R470–R471, R529, capacitors C164–C165, C199 and diodes D211, D213.
(3) Transistors T140–T141, resistors R472–R478, R528, R530, capacitors C166–C168, C200 and diodes D212, D214, D265, D260, at the upper portion of FIG. 16*b* will also be explained later.

Included in the schematic of FIGS. 16*a* and *b* will some components for the setting and triggering of the various circuits namely, C169–R483 for controlling the monostable multivibrator T142–T143; R482, R484–R485, C170 and D215–D216, D218 for controlling the counter FF1–FF4; and R479–R481, D220 for controlling the flipflop T138–T139.

The counter FF1–FF4 of FIG. 16*b* will be stepped once forward every time the stop (2 samples)/start element combination MARK-MARK-SPACE occurs on the diode combination D197–D200. If any other stop-start combination occurs, the counter will be reset provided that the flipflop T138–T139 is not set.

The setting of the flipflop T138–T139 is dependent upon the number of MARK-MARK-SPACE combinations received and will be explained later.

First a short explanation is given to show how start-stop synchronism is obtained.

If the stop-start combination, appearing on the diodes D197–D200 or D201–D204 is not MARK-MARK-SPACE or SPACE-SPACE-MARK respectively, the flipflop T136–T137 will be set, thereby indicating that the tested character elements represent neither a normal stop/start element pair nor an inverted stop/start element pair. This will cause triggering of the circuit T132–T133 in FIG. 14*a* via terminal M9, whereby the counter in FIG. 12*b* is delayed by 10 ms. The trailing edge of the pulse from the transistor T132 in FIG. 14*b*, will therefore via terminal M8 reset the flipflop T136–T137 of FIG. 16*b*.

As mentioned previously, a serial number period starts with 14 normal stop-start element pairs (MARK-MARK-SPACE) followed by one inverted element pair (SPACE-SPACE-MARK) and at last 10 element pairs carrying information about key character serial number or time position.

When start/stop synchronism is obtained, i.e. when the two input diode gates shown that only the signal combinations MARK-MARK-SPACE and SPACE-SPACE-MARK occur at the tested time positions, so that no further correction of the clock-pulse generator is necessary, the circuit is ready for handling the information about the key character serial numbers.

As mentioned the counter FF1–FF4 in FIG. 16*b* counts one step forward every time the combination MARK-MARK-SPACE occur in the tested time positions. The counter will therefore count to 14 upon occurrence of the first 14 normal start/stop pairs in a serial number period, and the flipflop T138–T139 will then be set. It should, however, be noted that some of the last stop/start pairs in the preceding serial number period may incidently also be normal, and that these will naturally also be counted by the counter. The counter may therefore reach position 14 before all the first 14 normal stop/start element pairs in a serial number period is reached, and the flipflop T138–T139 will therefore be set upon the counter reaching position 14.

When the flipflop T138–T139 then is set, indicating that the counter has reached or passed position 14, the flipflop T140–T141 will be set by the first inverted stop/start element pair (SPACE-SPACE-MARK). This indicates that the next stop-start element pairs will carry information about the key character serial number. This information is therefore transferred to a storage N which will be described below.

The detailed schematic of the storage N is shown in FIGS. 17*a* and *b*. It comprises a 10-stage binary counter whose flipflops can be individually set in compliance with the information contained in SRF1 in FIG. 12*a* of the character timer and register.

Figure 17B:
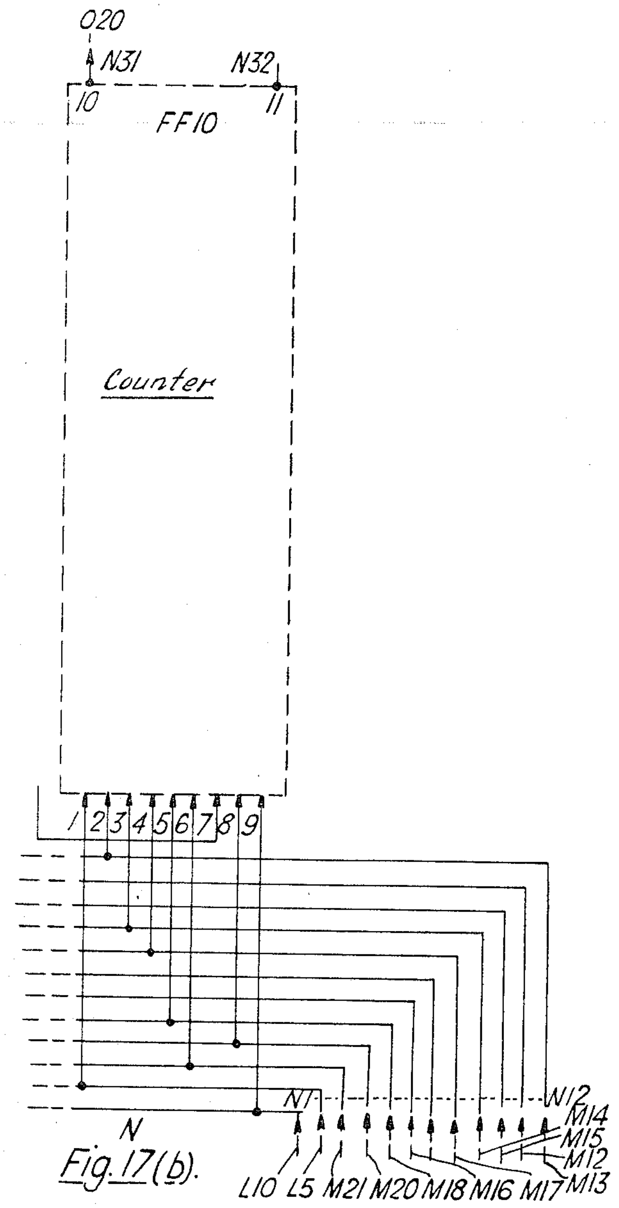

Each stage of FIG. 17 comprises a flipflop with cross gating (D269–R534–C203 and D270–R–539–C204) of the same type as used in the other binary counters in this embodiment of the present invention. In addition, each stage is provided with two input AND-gates R542–D272–D277 and R541–D278–D283. Each of these gates have 6 inputs. Their outputs are connected to the register inputs of an extra pair of normal RC triggering gates (R535–D268–C205 and R540–D271–C206 respectively) on the flipflop, comprising two transistors T153–T154, six resistors R531–R533, R536–R538, two capacitors C201–C202 and two diodes D266–D267.

The 6-input AND-gates are controlled by the output signals of the counter FF1–FF4 of FIG. 16*b* (the character evaluation counter) (terminals N5–N12), the output of flipflop T140–T141 of FIG. 16*b* (terminal N3) and the two complementary output signals from the shift register flipflop SRF1 of FIG. 12*a* (terminals N1–N2). The triggering pulse is supplied from the output amplifier of monostable multivibrator T128–T129 of FIG. 12 (terminal N4, M20, M10, L20).

According to this and the explanations given earlier, the storage N will work as follows:

When the first inverted stop-start element pair (SPACE-MARK) occurs after a sequence of minimum 14 consecutive normal stop-start element pairs (MARK-SPACE), the flipflop T140–T141 is triggered on (i.e. T141 becomes conducting). The counter FF1–FF4 of FIG. 16*b* is reset to 0000 simultaneously with the triggering of flipflop T140–T141. The next stop-start element pair arriving in SRF1–SRF5 of FIG. 12*a* will now as stated above contain the least significant bit of the transmitter character counter. Binary "1" will be represented as SPACE-MARK, "0" as MARK-SPACE in the stop-start time positions respectively.

When the pulse from the monostable multivibrator T128–T129 of FIG. 12*b* arrives on input terminal N4, the flip-flop T153–T154 (FF1) which represents the least significant bit of the storage counter, will be set in compliance with the corresponding stage of the transmitter key character counter. When the next stop-start combination arrives from the shift register of FIG. 12*a*, the counter FF1–FF4 (FIG. 16*b*) will be in position 0001. Therefore, the information contained in SRF will be transferred to FF2 of FIG. 17*a*. This process continues until the 10 bits of the transmitter key character counter are transferred to the storage counter of FIGS. 17*a* and *b*. In the meantime the storage counter will be stepped as a normal binary counter, once for every character, by pulses arriving on terminal N33.

Figure 6:
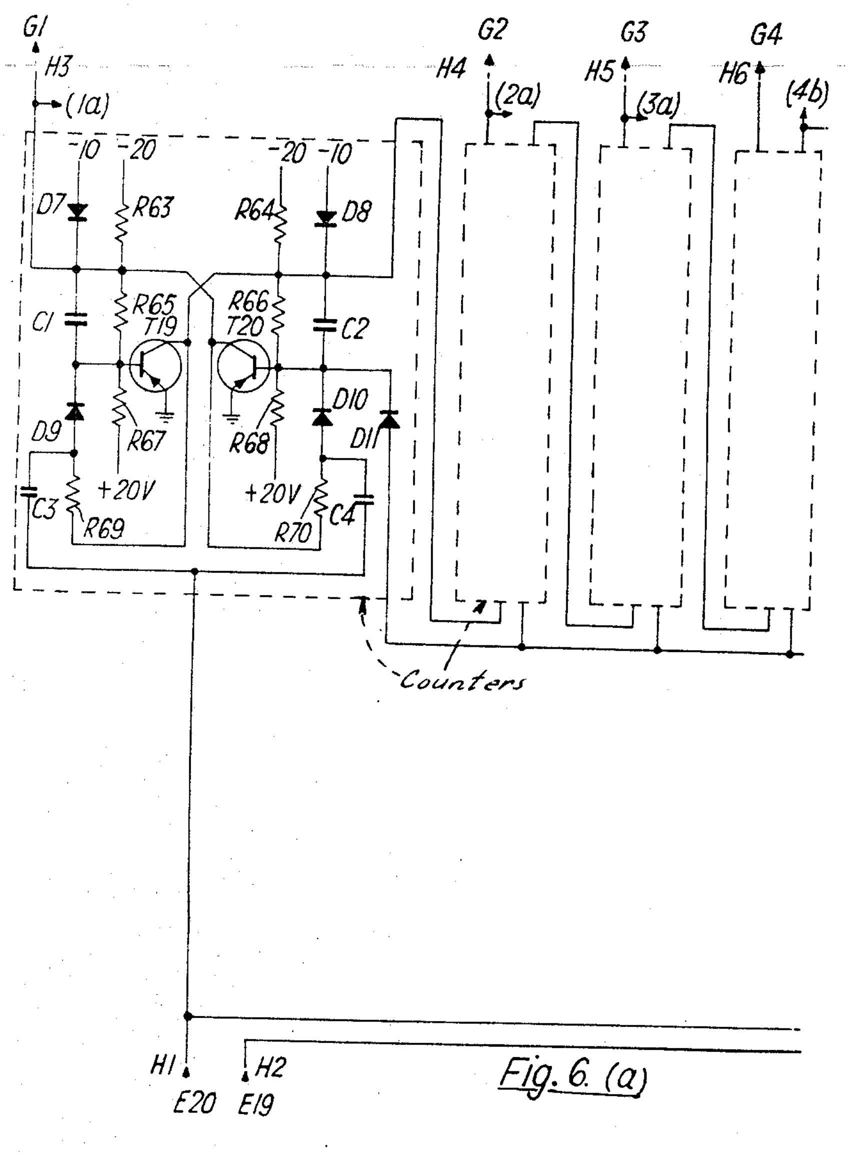
Figure 6:
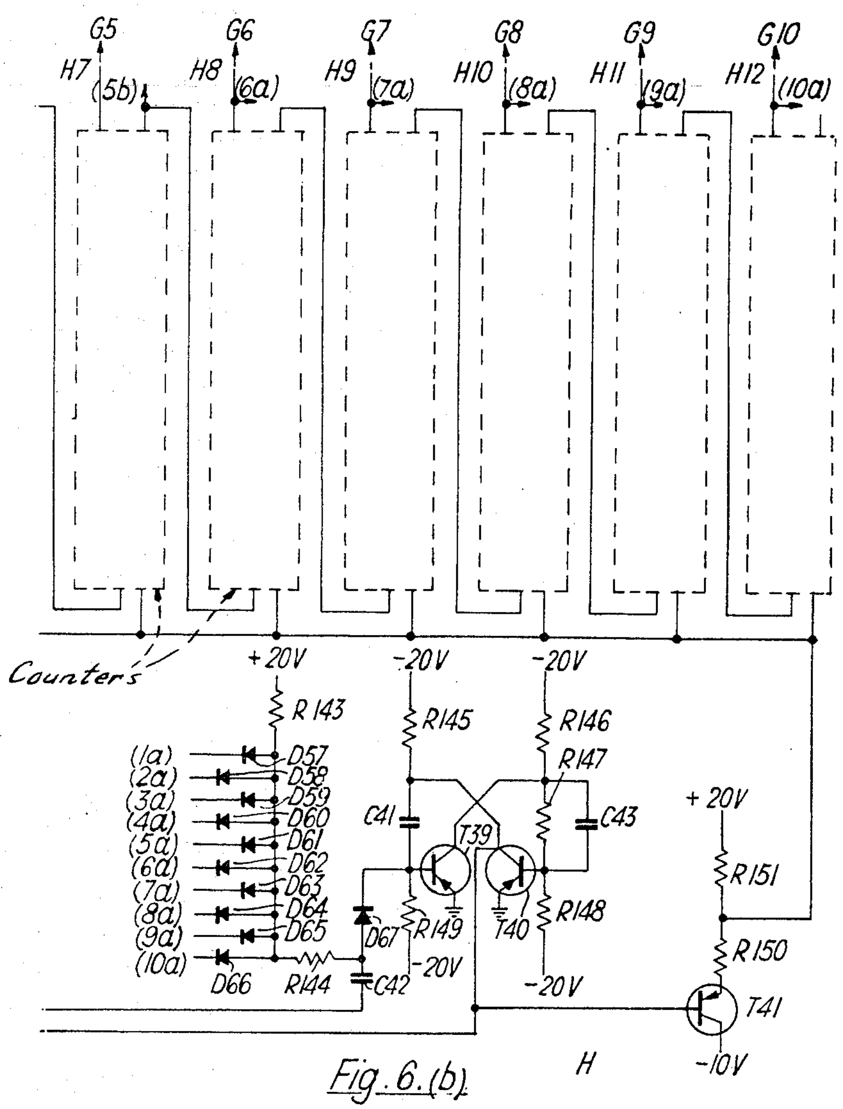

When the 10th bit has been received, the counter FF1–FF4 of the character evaluation counter in FIG. 16*b* will reach position 10. The output of the AND-gate R481, D220, D222, D224, D226, D228 will then become 0 volt, and the flipflops T138–T139 and T140–T141 will be reset. Another serial number period of 25 teleprinter characters will then commence. The interworking of the three blocks storage N, comparator 0 and key character counter P (see FIG. 11) is as follows:

The transmitter key character serial number will be transferred to the storage as described earlier, while the receiver key character serial number will be stored in block P, a binary counter with reset identical to the corresponding counter in the transmitter. Its detailed schematic is shown in FIG. 6. It is stepped by the receiver key tape driving pulses supplied from block R which will be described later.

The positions of the counters N and P are then compared in block O, the comparator. When the transmitter and receiver key tapes are in synchronism, the counters N and P will be in the same position. The corresponding signal from the comparator O to the key tape reader control R will result in normal stepping of the key tape reader. If key tape synchronism is lost during a period of transmission channel interruption, the counters N and P will have different position. The comparator will signal to the key tape reader control whether the receiving key character counter is in advance or delayed with respect to the storage counter. The stepping pulse rate will then be changed from the normal to correct for this difference.

The detailed schematic of the comparator is shown in FIGS. 18*a* and *b*. It comprises 10 identical blocks I–X plus a diode AND-gate R861–D447–D456 with 10 inputs, each of which is connected to a *d* output terminal on one of the 10 above mentioned blocks.

The 3 input terminals *a*, *b* and *c* of each block of FIGS. 18*a* and *b* receive the following signals:

*a* is connected to the corresponding stage of the receiver key character counter, *c* to the comparator. Block I corresponds to the least significant, X to the most significant digit of the two counters .The input *b* is connected to output *e* of the preceeding block. The input *b* of block I is not connected to any signal source.

The detailed schematic of one block (I) will then be explained. The transistors T173–T175 and associated components R661–R672 constitute two AND-gates (T173 and T175) which have their outputs combined into an OR-gate (T174). T176–T177 and associated components R673–R675, R678–R678 constitute an exclusive-OR circuit, the output of which is connected to an inverter (T178 and associated components R676–R677, R680). This circuit arrangement will function as follows: If the input signals *a* and *c* are equal (i.e. the two corresponding counter stages are in the same position) the input signal on input terminal *c* will pass unchanged to output terminal *e*. The output terminal *d* will be at 0 volts.

If the signals on *a* and *c* are different, the signal of input terminal *a* will be switched through to *e*. The output terminal *d* will then be negative. The signals on the output terminals 021 and 022 of the complete comparator will therefore be as follows:

021 will be at 0 volt provided the two counters are in the same position, otherwise this output signal will be negative.

When 021 is at 0 volt, 022 will be 0 volt since *b*I is not connected to any signal source. If 021 is negative due to different counter positions, 022 will be at 0 volt provided the receiver key character counter is in advance of the storage counter. 022 will be negative when the receiver key character counter is delayed with respect to the storage counter.

FIGS. 19*a* and *b* shows the detailed schematic of the key tape reader control circuit.

Figure 19B:
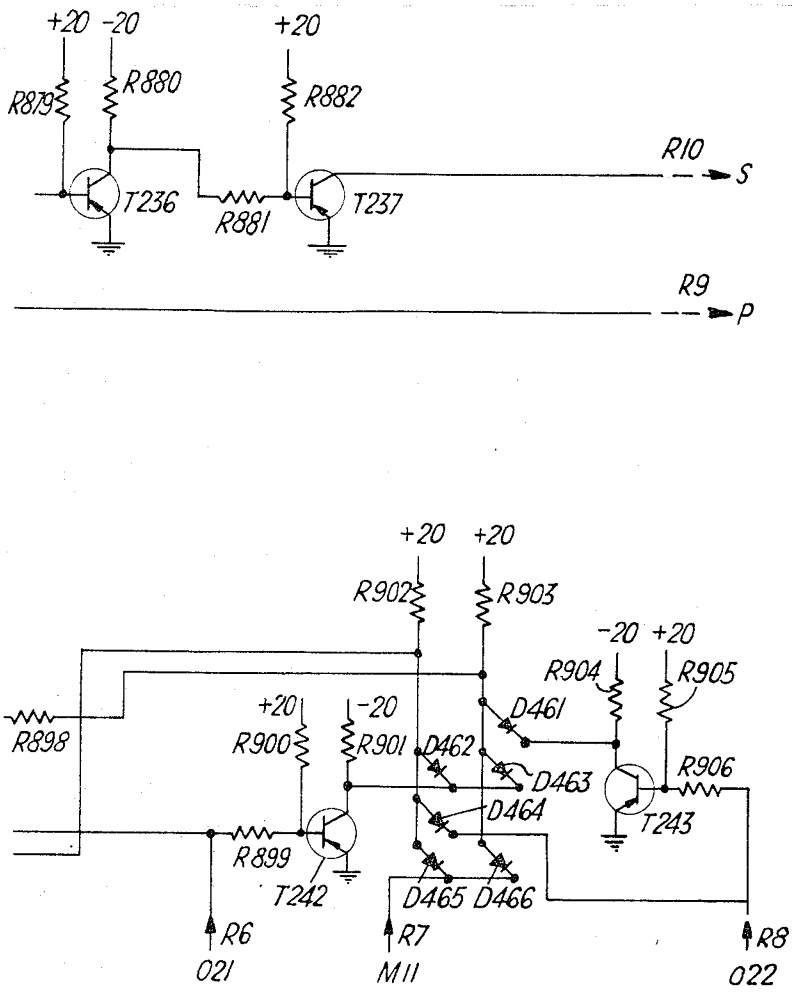

The transistors T233–T234 and associated components R862–R873 comprise two inverting AND-gates whose outputs are combined into an inverting OR-gate (T235 and associated components R874–R877). The input signals of the AND-gates are supplied from the counter of FIG. 12*b* and from the flipflops T238–T239 and T240–T241 (comprising R883–R890, C261–C262, C265–C266, D457–D458 and R891–R898, C263–C264, C267–C268, D459–D460 respectively), which are controlled by the circuit arrangement at the lower part of FIG. 19*b*. This circuit arrangement comprises two inverters T242, R899–R901 and T243, R904–R906 respectively, and two diode AND-gates R902, D462, D464, D465 and R903, D461, D466 respectively. T236–T237 and associated components R878–R882 constitute a power amplifier for the key tape reader stepping magnet (terminal R10).

The whole circuit arrangement will work as follows: When the said counters are in the same position, input terminal R6 will be at 0 volt. The flipflops T238–T239 and T240–T241 will then be triggered on and off respectively. The gate T233 will then have its AND-condition fulfilled during the first 20 milliseconds of each stop pulse (see FIG. 13). The receiver key tape reader will then be stepped normally, once for every character.

When the key character counter is in advance of the storage counter, the terminal R8 will be at 0 volt, R6 negative. When the last of a series of 10 information-carrying stop-start element pairs is received, the flipflop T238–T239 will be triggered off. The key tape reader and the key character counter will then receive no stepping pulses until the position of the last is identical to that of the storage counter. R6 will then become positive (0 volt), and the flipflop T238–T239 will be triggered on again.

When the key character counter is delayed with respect to the storage counter, R6 and R8 both will become negative. At the end of a 10-character series of stop-start element pairs, the flipflop T240–T241 will be triggered on. The key tape reader will then receive extra stepping pulses during the 2nd information element of each teleprinter character. In this way, it is stepped at double speed together with the key character counter, until the counters reach the same position. T240–T241 will then be triggered off, and normal stepping speed is thereby resumed.

It should be noted that the above described circuit may give a false indication when passing from one cycle of serial number periods to the next cycle, if a transmitter (receiver) serial number belonging to one cycle is compared with a receiver (transmitter) serial number belonging to the next cycle. This problem may however, easily be taken care of by a circuit (not shown) comparing the first three or four most significant bits of the two compared serial numbers in order to find out whether these belong to different cycles and in that case signal to the key tape reader control circuit R and that the output signals or terminals 021 (R6) and 022 (R8) therefore must be considered unvalid. The period of time corresponding to one cycle of serial number periods must obviously be chosen so long that the transmitter and receiver key tapes are never displaced with respect to each other, by more than a time period corresponding to a half cycle of serial number periods.

The receiver key tape reader schematic is identical to that shown in FIG. 3 except for the terminal numbering. The wiring is, however, equivalent with that of the transmitter, and will not be shown separately. The same applies to the mixing circuits of block Q. They are of the parallel type, equivalent to what is shown in FIG. 4. The enciphered text to be decrypted is supplied from the shift register of FIG. 12*a*. The printing process can be performed in compliance with normal teleprinter technique and will not be described more detailed here.

We claim:

1. Method for synchronizing cryptographic teleprinter equipment comprising the enciphering of a plain text at the transmitting end by processing it with a key material according to some predetermined rule, and recovering the plain text at the receiving end by processing the enciphered text with a duplicate of the said key material, characterized in this that the start pulse time positions and/or stop pulse time positions of the enciphered teleprinter characters are used for transmitting information in form of a serial number indicating the setting of said key material in relation to a predetermined starting time position.

2. Method according to claim 1, characterized in this that start/stop synchronism of the teleprinter characters is obtained at the receiver by observing the potentials at three time positions during each time interval corresponding to the duration of one teleprinter character, the three time positions being spaced so as to occur two within a stop element position and one within a start element position.

3. Method according to claim 2, characterized in this that the three time positions are arranged to occur within a stop element position and the succeeding start element position.

4. Method according to claim 1, characterized in this that the serial number information of the enciphered characters is transmitted in a binary representation.

5. Method according to claim 4, characterized in this that each serial number is a representation of a position of a binary counter being stepped forward in synchronism with the setting of the key source.

6. Method according to claim 5, characterized in this that each desired counter position is stored until it is transmitted bit for bit via the start/stop time positions.

7. Method according to claim 4, characterized in this that the stages of a binary counter which is stepped forward in synchronism with the setting of the key source are read, one by one, and transmitted one by one via individual start and/or stop time positions in succeeding teleprinter characters.

8. Method according to claim 7, characterized in this that the information received at the receiving end, concerning the serial number of the enciphered character is compared with the setting of the receiver key source and that the receiver key source is set (forward or backward) in response to a control signal resulting from said comparison so as to obtain synchronism between the receiver and transmitter key source.

9. Method according to claim 8, characterized in this that the receiver is provided with a counter which is stepped in synchronism with the setting of the receiver key source and that the output of the counter is used in said comparison process.

10. Method according to claim 4, characterized in this that each serial number is transmitted within a predetermined number of teleprinter characters, called a serial number period.

11. Method according to claim 10, characterized in this that each serial number period comprises characters having ordinary start and stop pulses, and characters having start and/or stop time positions which contain a binary representation of said serial number.

12. Method according to claim 11, characterized in this that each serial number period commences with a series of teleprinter characters having ordinary start and stop pulses, followed by one teleprinter character having inverted start and/or stop pulse indicating that the following teleprinter characters' start and/or stop time positions contain said serial number information.

13. Method according to claim 12, characterized in this that the serial numbers are transmitted at regular intervals.

14. Method according to claim 13 characterized in this that a succession of a predetermined number of individual serial numbers are transmitted in successive cycles.

15. Method according to claim 14 characterized in this that any predetermined combination of start and stop time positions of the number of teleprinter characters within each serial number period are used for representing said serial numbers.

16. Method according to claim 15 and according to which only the start time positions are used for the binary representation of each serial number, characterized in this that the potential of the corresponding stop time positions are complements to the potentials of the start element positions.

17. The method according to claim 15 and according to which only the stop time positions are used for the binary representation of each serial number, characterized in this that the potental of the corresponding start time positions are complements to the potentials of the stop element positions.

References Cited

UNITED STATES PATENTS

| | | | |
|---|---|---|---|
| 2,924,658 | 2/1960 | Slayton | 178—22 |
| 3,185,765 | 5/1965 | Berjon | 178—22 |

NEIL C. READ, *Primary Examiner.*

THOMAS A. ROBINSON, *Examiner.*